United States Patent
Veiga et al.

(10) Patent No.: US 11,721,232 B2
(45) Date of Patent: Aug. 8, 2023

(54) FLANGE AND GASKET ASSEMBLY TRAINING SIMULATOR

(71) Applicant: Teadit N.A., Inc., Pasadena, TX (US)

(72) Inventors: Jose Carlos Carvalho Veiga, Rio de Janeiro (BR); Carlos Daniel Braga Girão Barroso, Rio de Janeiro (BR); Igor Meira, Rio de Janeiro (BR); Leonardo Rocha de la Roca, Rio de Janeiro (BR)

(73) Assignee: TEADIT N.A., INC., Pasadena, TX (US)

( * ) Notice: Subject to any disclaimer, the term of this patent is extended or adjusted under 35 U.S.C. 154(b) by 184 days.

(21) Appl. No.: 17/450,024

(22) Filed: Oct. 5, 2021

(65) Prior Publication Data

US 2023/0108842 A1    Apr. 6, 2023

(51) Int. Cl.
  *G09B 19/00* (2006.01)
  *G09B 9/00* (2006.01)
(52) U.S. Cl.
  CPC ........... *G09B 9/00* (2013.01); *G09B 19/0069* (2013.01)
(58) Field of Classification Search
  CPC .............................. G09B 9/00; G09B 19/0069
  See application file for complete search history.

(56) References Cited

U.S. PATENT DOCUMENTS

| 5,719,785 A | * | 2/1998 | Standifer | G01M 3/243 702/140 |
| 6,516,896 B1 | * | 2/2003 | Bookshar | B23P 19/066 173/217 |
| 7,499,845 B1 | | 3/2009 | Quincy et al. | |
| 9,897,501 B2 | | 2/2018 | Futai | |

(Continued)

FOREIGN PATENT DOCUMENTS

| JP | 5716386 B2 | 5/2015 |
| WO | WO 2021/009938 A1 | 1/2021 |
| WO | WO 2021/183695 A1 | 9/2021 |

OTHER PUBLICATIONS

International Search Report and Written Opinion of the International Search Authority issued by the U.S. Patent and Trademark Office for International Application No. PCT/US2022/077063 dated Jan. 19, 2023. (13 pages).

(Continued)

*Primary Examiner* — Jay Trent Liddle
*Assistant Examiner* — Alyssa N Brandley
(74) *Attorney, Agent, or Firm* — Haynes and Boone, LLP

(57) ABSTRACT

An apparatus, system, and method according to which a user is trained in flange and gasket assembly. A simulator models placing a gasket in between a pair of flanges and inserting a plurality of bolts into the pair of flanges. The user simulates tightening one or more of the plurality of bolts, in accordance with a particular tightening pattern, in order to create a proper seal, although the user may tighten the bolt in any order. The simulator provides simulated stress values for (Continued)

each bolt in the plurality of bolts to guide the user in proper flange and gasket assembly. The simulated stress values are based on an empirical, mathematical model and take into account elastic interactions between bolts. The assembly training ends when the user completes the tightening pattern or makes an irreversible error. The user is then provided with a score.

20 Claims, 14 Drawing Sheets

(56) References Cited

U.S. PATENT DOCUMENTS

| | | | |
|---|---|---|---|
| 10,909,872 B2 | 2/2021 | Albrecht | |
| 2005/0058969 A1 | 3/2005 | Matthews | |
| 2007/0264620 A1* | 11/2007 | Maddix | G09B 19/003 434/219 |
| 2013/0047408 A1 | 2/2013 | Kibblewhite | |
| 2017/0082510 A1* | 3/2017 | Futai | G09B 19/24 |
| 2017/0262002 A1* | 9/2017 | Chu | B25B 23/1453 |
| 2019/0035305 A1 | 1/2019 | Robertson et al. | |
| 2019/0196590 A1 | 6/2019 | Kim et al. | |
| 2020/0125846 A1 | 4/2020 | Laughlin et al. | |
| 2020/0147771 A1 | 5/2020 | Mergener et al. | |
| 2020/0215670 A1 | 7/2020 | Sorensen et al. | |
| 2020/0400525 A1* | 12/2020 | King | G01L 3/00 |
| 2021/0252681 A1 | 8/2021 | Murui et al. | |

OTHER PUBLICATIONS

Gordon et al. Optimization of Re-Torgue and Relaxation Parameters of the GUCP. Jul. 17, 2011 (Jul. 17, 2011). [retrieved on Dec. 22, 2022], Retrieved from the Internet: <URL: https://momrg.cecs.ucf.edu/wp-content/uploads/2019/05/Drilling-B.-Gordon-A.-P.-Kammerer-C-and-Baldwin-F.-2011-Optimization-of-Re-Torgue-in-Bolted-Flange-Connections.pdf> pp. 1-9. (9 pages).

Loibl et al. Knowledge-Based Support During Design Optimization Using Flanges as an Example. Dec. 31, 2018 (Dec. 31, 2018). [retrieved on Dec. 22, 2022], Retrieved from the Internet: <URL: https://www.designsociety.org/download-publication/40564/KNOWLEDGE-BASED+SUPPORT+DURING+DESIGN+OPTIMIZATION+USING+FLANGES+AS+AN+EXAMPLE> pp. 1619-1630. (12 pages).

* cited by examiner

FLANGE AND GASKET ASSEMBLY TRAINING SIMULATOR

BACKGROUND

The present disclosure relates, in general, to a flange and gasket assembly training simulator, and in particular, a simulator that trains the user in gasket installation and flange assembly patterns by fastening bolts.

DETAILED DESCRIPTION

Figure 1:
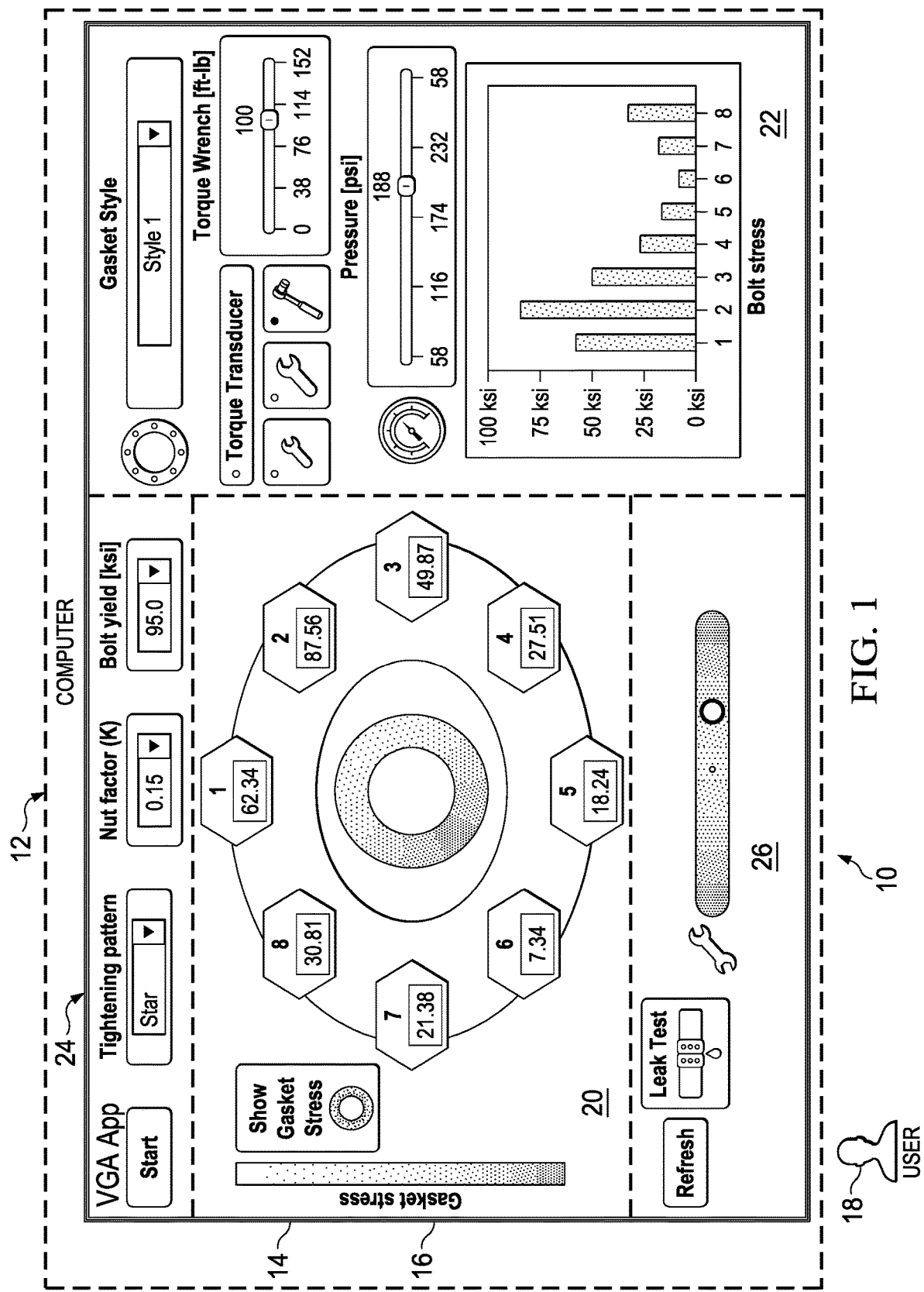
FIG. 1 is a diagrammatic illustration of a system according to an example embodiment, the system including a computer comprising a graphical user interface ("GUI") that is configured to display a window.

It is to be understood that the present disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, reference numeral 10 generally refers to a flange and gasket assembly training simulator application, according to one embodiment. The simulator 10 includes a computer 12. The computer 12 includes a graphical user interface ("GUI") 14 that is configured to display a window 16 to a user 18. The window 16 is a display for the assembly training. The window 16 is divided into four sections 20, 22, 24, and 26 in order to provide more detail.

Figure 2:
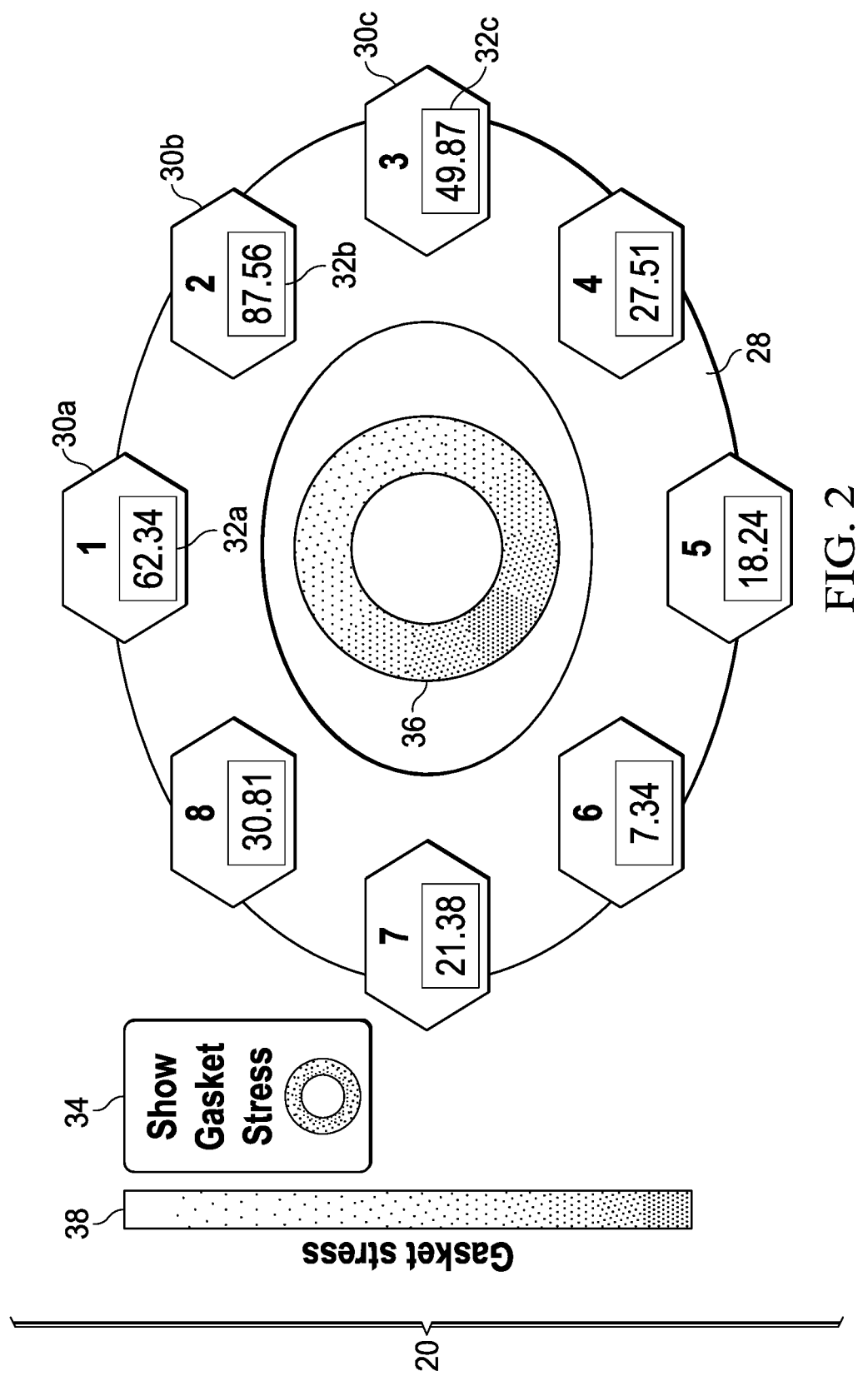
FIG. 2 is a diagrammatic illustration of a portion of the window displayed on the GUI of the computer of FIG. 1, according to one or more embodiments of the present disclosure.

Referring to FIG. 2, section 20 of window 16 of FIG. 1 is shown in more detail. The section 20 of window 16 displays a portion of a flange joint, particularly a flange 28 that contains a plurality of bolts. The flange joint includes a pair of flanges with a gasket in between the two flanges that are coupled together by the plurality of bolts. Each bolt (e.g., 30a, 30b, and 30c) in the plurality of bolts is numbered clockwise and has a stress value box 32 inside the respective bolt that displays its current stress value. The window 16 also includes a show gasket stress icon 34. The show gasket stress icon 34 allows the user to view gasket stress, by displaying a visual representation of the gasket stress distribution in a gasket stress distribution ring 36 inside the flange 28. The gasket stress distribution ring 36 uses a color scale to determine the current sealing condition of the gasket, whether there is a good seal or not, according to bolt stress distribution and gasket style material properties. The gasket stress bar 38 is provided on the display as a key showing what colors on the gasket stress distribution ring are good (a strong seal) or bad (leakage).

Figure 3:
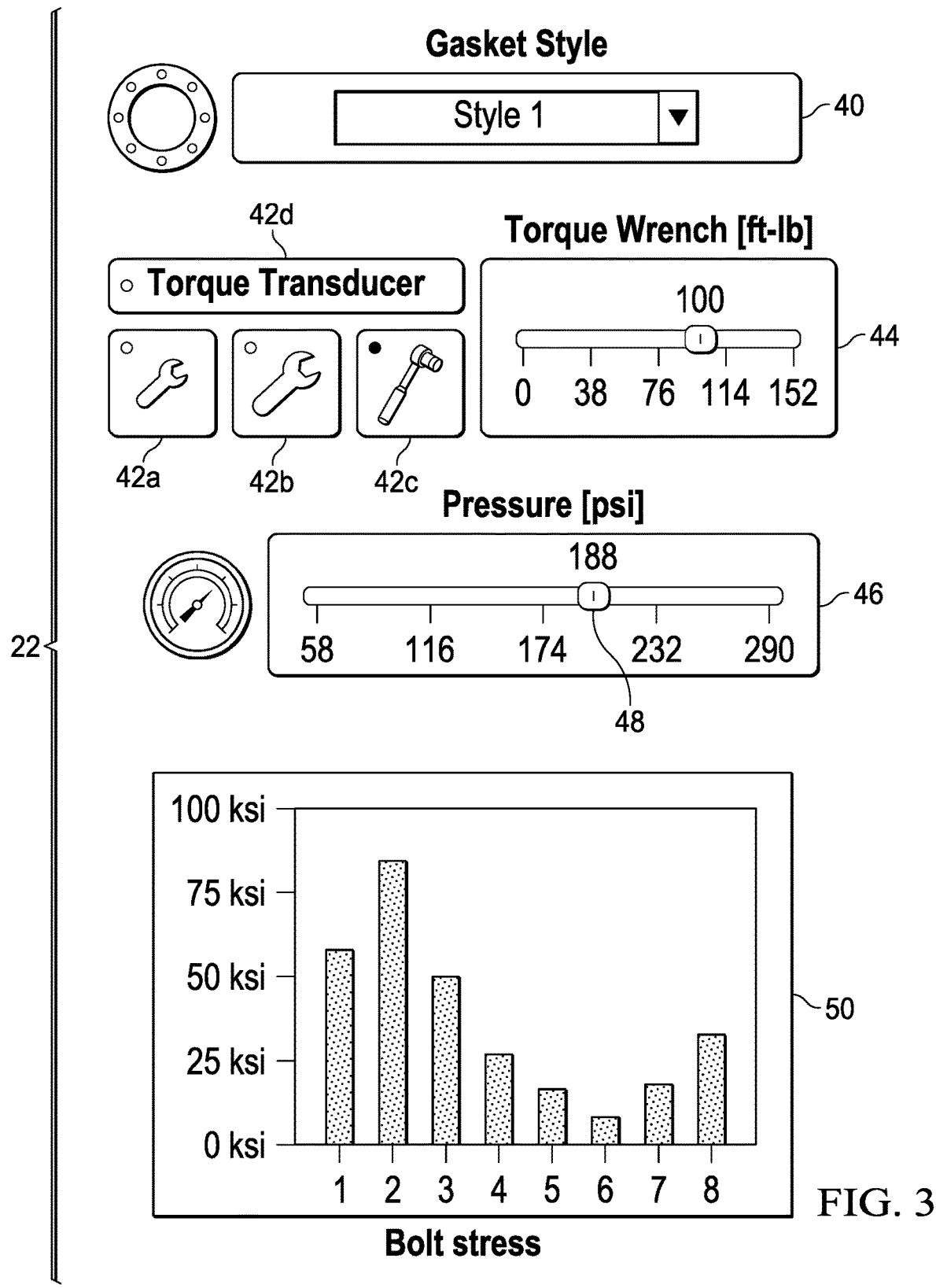
FIG. 3 is a diagrammatic illustration of another portion of the window displayed on the GUI of the computer of FIG. 1, according to one or more embodiments of the present disclosure.

Referring to FIG. 3, section 22 of window 16 of FIG. 1 is shown in more detail. The section 22 of window 16 includes a plurality of icons that allows the user 18 to select a plurality of parameters. A gasket style box 40 allows the user 18 to select a type or style of gasket to test in the simulator 10. The window 16 also includes three options for virtual torque tools: a small wrench 42a, a large wrench 42b, and a torque wrench 42c. A fourth option lets the user choose a torque transducer hardware 42d to set the torque and tighten the bolts. The torque transducer 42d may be an actual, physical torque transducer operably coupled to the simulator 10. The torque value for the simulator 10 of the torque wrench 42c is set using a torque wrench bar 44, where the torque wrench bar 44 has a torque slider widget that allows the user 18 to select the torque value for the torque wrench 42c. The pressure is set by a pressure bar 46, where the pressure bar 46 has a pressure slider widget 48 that allows the user 18 to select a pressure to test. Additionally, a bar plot 50 of bolt stress is included on the window 16. The bar plot 50 displays the stress of each bolt of the plurality of bolts 30, where each bolt in the plurality of bolts 30 has a respective column in the graph.

Figure 4:
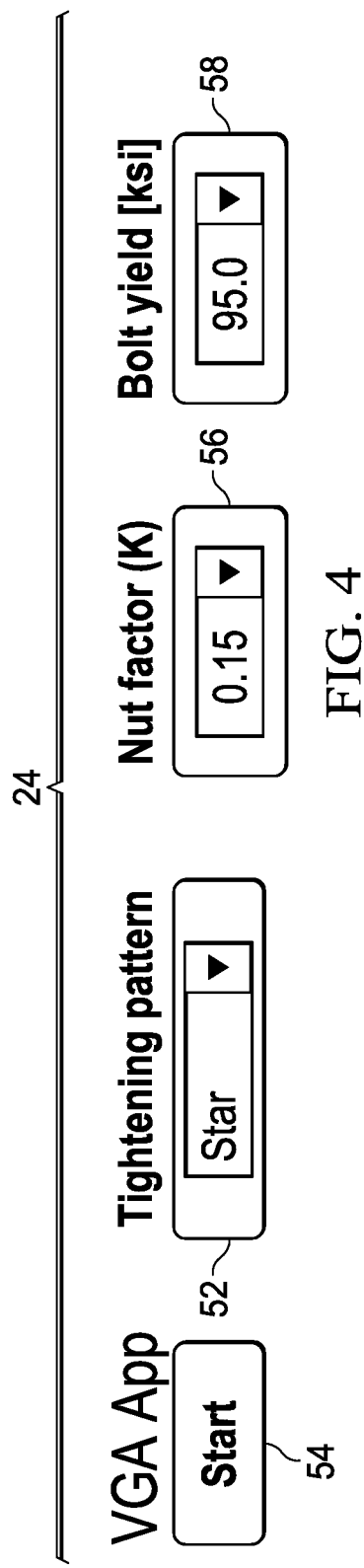
FIG. 4 is a diagrammatic illustration of, yet another portion of the window displayed on the GUI of the computer of FIG. 1, according to one or more embodiments of the present disclosure.

Referring to FIG. 4, section 24 of window 16 of FIG. 1 is shown in more detail. Section 24 of the window 16 further highlights a plurality of parameters for the simulator 10. A tightening pattern option menu 52 allows the user 18 to select a pattern of flange tightening to be tested. A start button icon 54, which initiates the assembly training, is also included. The window 16 further includes a nut factor icon 56, which sets the bolt lubricant coefficient of friction (K value) of the assembly training. The nut factor icon 56 allows a user to select from a menu a plurality of K factor values. A bolt yield option menu 58 allows the user to set the bolt yield stress, which is set upon all bolts.

Figure 5:
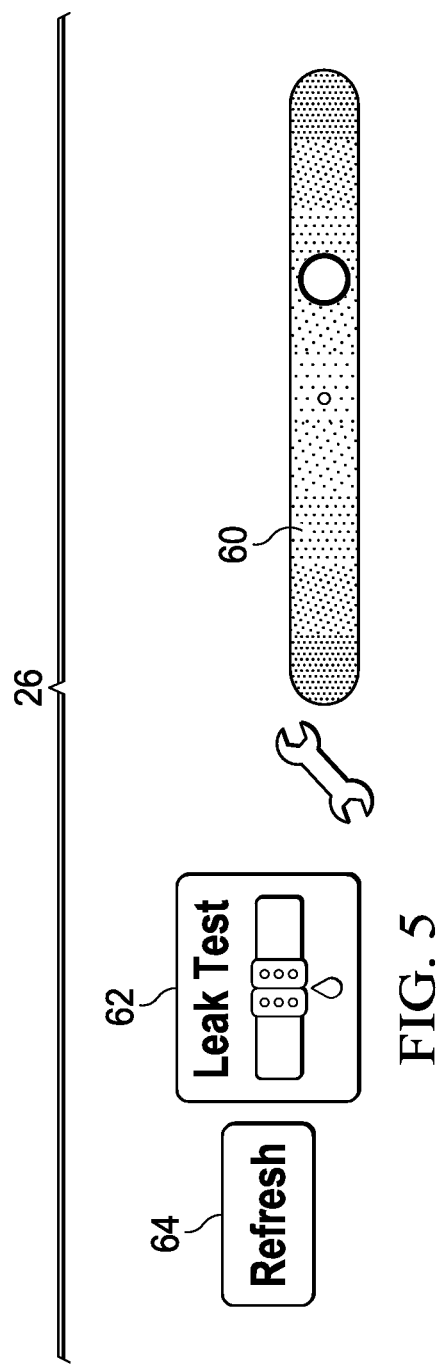
FIG. 5 is a diagrammatic illustration of another portion of the window displayed on the GUI of the computer of FIG. 1, according to one or more embodiments of the present disclosure.

Referring to FIG. 5, section 26 of window 16 of FIG. 1 is shown in more detail. Section 26 of the window 16 further includes a leak test icon 62. The leak test icon 62 when pressed, clicked, or otherwise selected simulates applying pressure in the flange chamber of the flange joint. A pointer includes a small oscillating ball, which is continuously moving back and forth in harmonic motion inside a bar 60. The bar 60 for the assembly training of the tools 42a and 42b has a color index to indicate higher or lower torque, in which the user 18 should identify the correct tightening torque for each tightening step. A reset button 64, which resets the assembly training to the original settings, so that a new assembly training may begin is also included. In some embodiments, the reset button 64 is labeled refresh button 64.

In operation, with continuing reference to FIGS. 1-5, in an example embodiment, the user 18 trains using the simulator 10 to become adept at flange and gasket assembly. The user 18 selects the non-adjustable parameters: the tightening pattern from the tightening pattern option menu 52, bolt yield stress from the bolt yield option menu 58, gasket style to be installed from the gasket style box 40 and nut factor (K) from the nut factor icon 56. Then, the user 18 selects the start button icon 54 to begin the simulator 10. During the assembly training, the user 18 may set various adjustable parameters, such as selecting the wrench 42a and 42b or torque wrench 42c or torque transducer 42d to be used to tighten the bolts, selecting the torque value using the torque wrench bar 44 (in the case, where the torque wrench 42c is chosen), and pressure value for the assembly training using the pressure bar 46. The user 18 then may select a bolt (e.g., 30b) from the plurality of bolts 30 to tighten in accordance with the tightening pattern selected earlier. Throughout the assembly training, the user 18 may change the adjustable parameters based on the requirements of the particular training and/or tightening pattern. The bolt (e.g., 30b) is tightened by pressing, clicking, or otherwise selecting the respective bolt (30b). All bolts start with zero stress. However, as the bolts 30 are tightened and loosened their stress values and/or simulated force values change and are updated in their respective stress value box 32 and their respective column in the bar plot 50. The simulated force is the force used to compress a virtual gasket. Using an empirical mathematical model, the elastic interactions simulate the effect that, when one bolt is tightened or loosened, it affects the stress on the other bolts of the flange 28.

Figure 6:
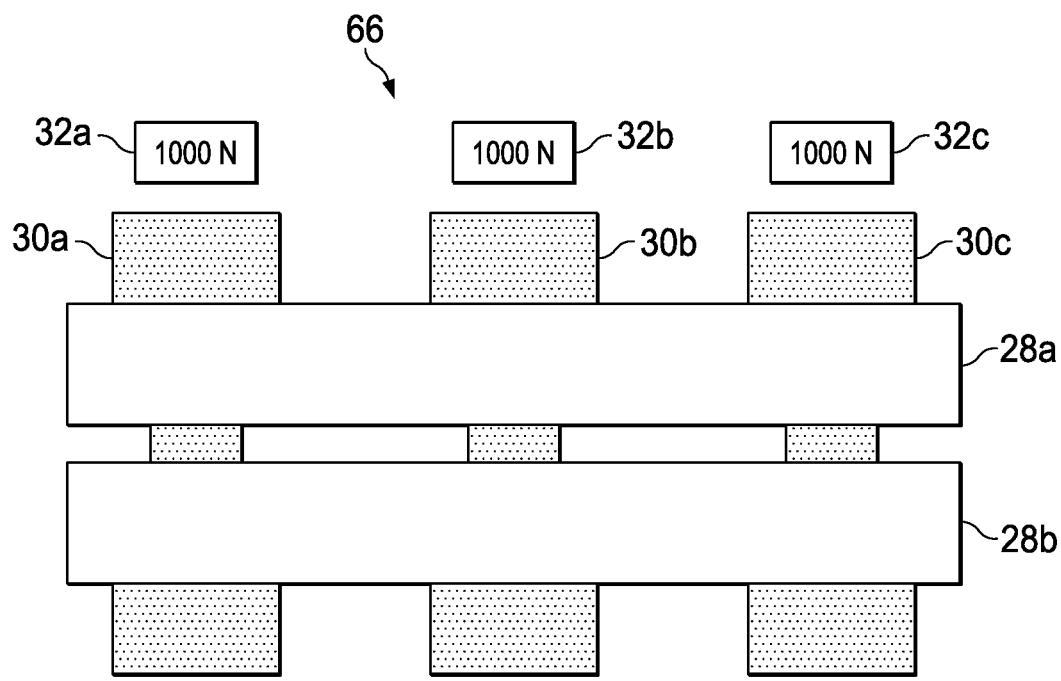
FIG. 6 is a diagrammatic illustration of bolts prior to tightening a bolt, according to one or more embodiments of the present disclosure.
Figure 7:
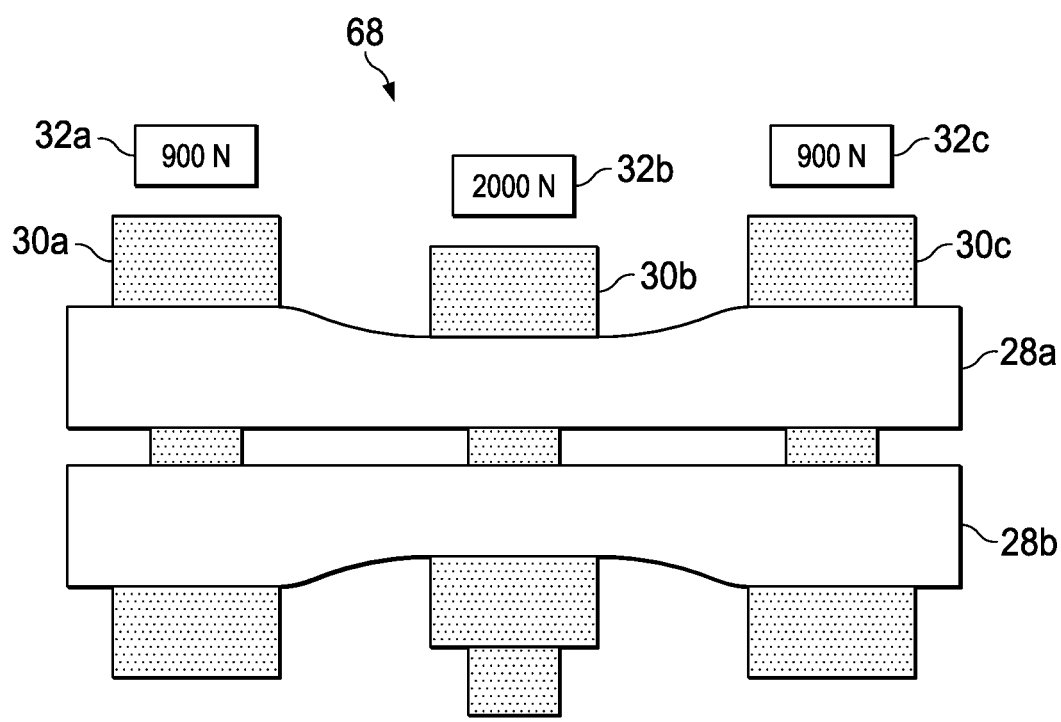
FIG. 7 is a diagrammatic illustration of bolts after tightening a bolt, according to one or more embodiments of the present disclosure.

Referring to FIGS. 6 and 7 as an example of elastic interaction, an elastic interaction between bolts 30a, 30b, and 30c is shown. Bolts 30a, 30b, and 30c are shown connecting a pair of flanges 28a and 28b. In FIG. 6, the same simulated force is applied to each bolt (e.g., 1000N). In FIG. 7, bolts 30a, 30b, and 30c are still shown as connecting a pair of flanges 28a and 28b, but the same force and/or tightening is not applied to each bolt 30a, 30b, and 30c. Instead, bolt 30b has an additional 1000N of force and/or tightening applied as seen in the stress value box 32b in FIG. 7. Due to elastic interaction, the force applied to 30a and 30c drops to 900N as seen in the stress value boxes 32a and 32c, respectively, as a result of tightening bolt 30b. The elastic interaction depends on the style of gasket selected and stress intensity. In general, when the selected bolt is tightened, the simulated forces (e.g., stress values) increase for that bolt. However, the simulated forces (e.g., stress values) for the bolts on either side of/adjacent to the selected bolt have a reduced stress value as a result of tightening the selected bolt. The other bolts of the plurality of bolts 30 are also affected accordingly.

The user 18 may press, click, or otherwise select the show gasket stress icon 34 to view gasket stress according to the plurality of bolts 30 at any point in the assembly training. The user 18 may press, click, or otherwise select the leak test icon 62 to conduct a simulated leak test. Pressing, clicking, or otherwise selecting the leak test icon changes the background color of each bolt's respective stress value box 32: red to show leaking and green to indicate a stress value greater than the recommended sealing stress for the selected gasket style. To complete the assembly training, the user 18 follows the specific tightening pattern selected. If the user 18 correctly follows the specific tightening pattern selected and selects an acceptable torque value for each tightening step, then the user 18 will pass, therefore obtaining a good score.

Figure 8:
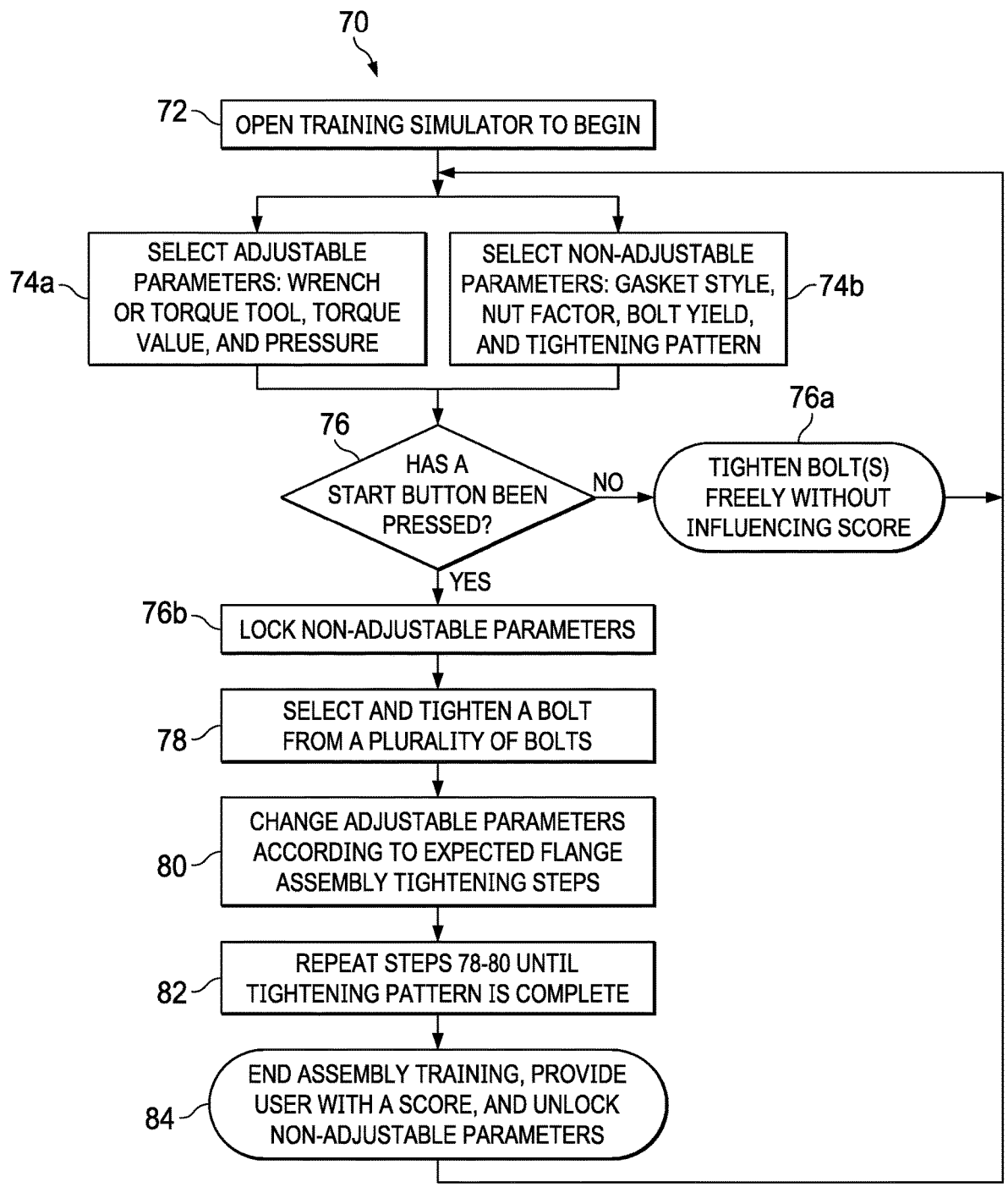
FIG. 8 is a flow chart diagram of a method according to one or more embodiments of the present disclosure.

FIG. 8 is a flow chart showing an example method 70 of using the simulator 10 to determine proper gasket installation and flange assembly patterns by fastening bolts and to show the elastic interaction between the bolts. It is understood that additional steps can be provided before, during, and after the steps of method 70, and that some of the steps described can be replaced or eliminated for other implementations of the method.

At a step 72, open the training simulator 10 to begin. At a step 74a, one or more adjustable parameters may be selected from any one or more of: wrench or torque tool, torque value, and pressure. At a step 74b, one or more non-adjustable parameters may be selected from any one or more of: gasket style, nut factor, bolt yield, and tightening pattern. At a step 76 a verification is made whether the user 18 has pressed the start button icon 54. If the start button icon 54 was not pressed, the user 18 is free to continue and tighten any bolt from the plurality of bolts 30 and perform any interaction without it counting toward the score at a step 76a. The process 72-76 is repeated until the user 18 presses the start button icon 54, which then initiates the assembly training. If the start button icon 54 was pressed, all non-adjustable parameters (gasket style, nut factor, bolt yield and tightening pattern) are locked so the user 18 can no longer change them at a step 76b. At a step 78, the user 18 may then proceed to select and tighten a bolt from the plurality of bolts 30. At a step 80, the user 18 may change any adjustable parameters (wrench or torque tool, torque value and pressure) as so to proceed with the expected tightening step of the selected tightening pattern. At a step 82, the user 18 repeats steps 78-80 by continuing to select bolts in the plurality of bolts 30 to tighten or loosen and select adjustable parameters based on the selected tightening pattern until the tightening pattern is complete. At a step 84, once the tightening pattern is completed, the user 18 is provided with a score, the locked non-adjustable parameters are now unlocked, and the assembly training returns to its initial stage immediately after step 72.

In some embodiments and at step 72, the application is executed, and the GUI initiated, starting the simulator 10.

In some embodiments, at step 72 or before step 76, a tightening pattern is automatically chosen for the user 18. In some embodiments, the simulator 10 begins automatically when the window 16 is opened at step 72 and does not require the start button icon 54.

In some embodiments and at step 74a, one or more of the parameters are automatically chosen by the simulator 10 for the user 18. In one or more embodiments, the parameters do not need to be changed each time a bolt is selected. In one or more embodiments, the same parameters are to be used and step 74a can be omitted. In one or more embodiments, the step 74a of selecting the one or more parameters includes maintaining the one or more parameters, that were previously selected; in such embodiments, no new or replacement selection of parameters is received at the step 74a, that is, at the step 74a no new action is taken on the part of the user 18 or the simulator 10.

In some embodiments and at step 74b, one or more of the parameters are automatically chosen by the simulator 10 for the user 18. In one or more embodiments, the parameters do not need to be changed each time a bolt is selected. In one or more embodiments, the same parameters are to be used and step 74b can be omitted. In one or more embodiments, the step 74b of selecting the one or more parameters includes maintaining the one or more parameters, that were previously selected; in such embodiments, no new or replacement selection of parameters is received at the step 74b, that is, at the step 74a no new action is taken on the part of the user 18 or the simulator 10. In some embodiments, the simulator 10 locks the non-adjustable parameters to prevent these parameters from being changed.

In some embodiments, starting the assembly training includes pressing, clicking or otherwise selecting the start button icon 54 at the step 76. If the start button icon 54 has not been selected, the step 76a occurs. When the user selects a bolt from the plurality of bolts 30 to tighten, the bolt tightens; all bolts of the plurality of bolts 30 and gasket stresses are calculated; and all bolt related stresses are displayed at the step 79. At the step 76a, the score is not calculated. If the start button icon 54 has been selected, step 76b occurs, which locks the previously input non-adjustable parameters.

In one or more embodiments and at step 78, the bolt is selected by pressing, clicking, or otherwise selecting the bolt icon. In some embodiments, the same bolt is selected in the next iteration of the method steps. In other embodiments, a different bolt from the plurality of bolts 30 is selected. In some embodiments, once a bolt is selected from the plurality of bolts 30 the score is altered and/or calculated. In some embodiments, more than one bolt may be selected at a time.

Figure 9:
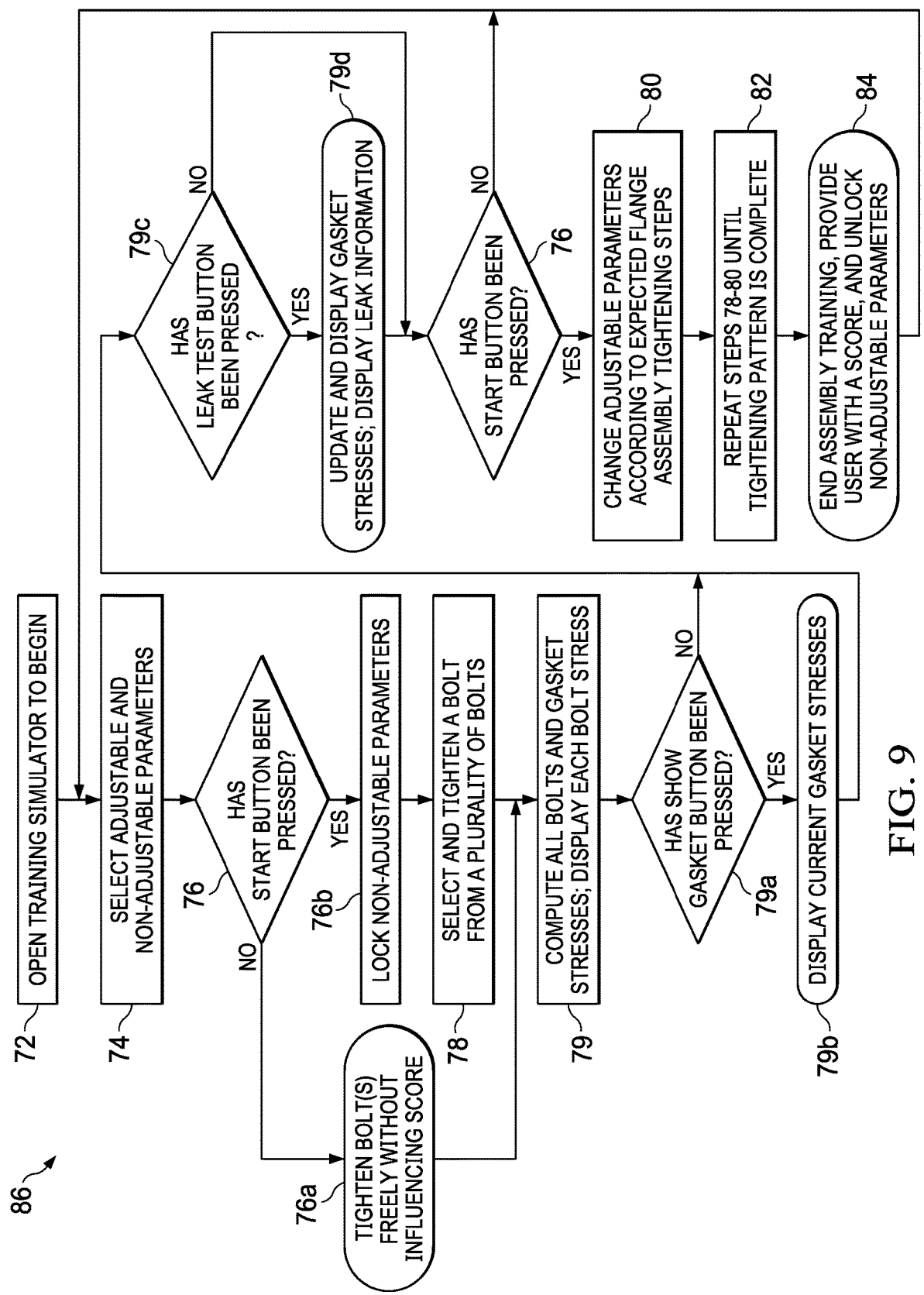
FIG. 9 is a flow chart illustrating a method of operating the system of FIG. 1 according to one or more embodiments.

FIG. 9 relates to displaying the elastic interaction between the plurality of bolts 30. In FIG. 9, a flow chart, showing an example method 86 is presented to demonstrate how the simulator 10 determines when to display bolt stress of the plurality of bolts 30. It is understood that additional steps can be provided before, during, and after the steps of method 86, and that some of the steps described can be replaced or eliminated for other implementations of the method. In some embodiments, for example, steps 72-84 of FIG. 8 are substantially similar to those in FIG. 9, and the method of FIG. 8 further includes additional steps, as provided in FIG. 9. A step 79 of method 86 provides for when the assembly training computes the gasket and bolts stresses, taking into account the elastic interactions between the bolts 30. Step 79a asks: has the show gasket stress button 34 pressed? If yes, the gasket is displayed with its stress distribution shown on the gasket distribution ring 36 at a step 79b. If no, the assembly training continues without the gasket distribution ring 36 being updated. A step 79c asks: has the leak test icon 62 been pressed? If yes, the gasket stresses are updated considering the pressure effect on the flange 28 (reducing the gasket stresses) at a step 79d. A step 84 ends the assembly training, providing the user with a score and unlocking the non-adjustable parameters.

In some embodiments and at the step 79, the assembly training is running a plurality of calculations to display the simulated stress values. In some embodiments, the simulated stress values are based on real-world experimental data. In some embodiments, the assembly training models a real-world phenomenon called a cross-sectional interaction, such that when the first bolt is selected to be tightened, a cross-interaction happens where the bolt opposite from the first that was tightened increases in force. Generally, the cross-interaction only occurs on the first tightening. However, the cross-interaction is always computed when a bolt of the plurality of bolts 30 is tightened.

In some embodiments, the step 79 occurs each time a bolt is selected to be tightened or loosened, a calculation is made to determine the simulated stress values to be displayed. The model is made to simulate real time and real-life conditions. To simulate the forces (or gasket stress), an empirical, mathematical model was created using experimental results to accurately define the interactions. The mathematical model, according to one or more embodiments, is as follows:

$$F_i^{t+1} = F_i^t + C \times \Delta F_i^t.$$

The mathematical model takes into account force in each bolt at t+1 (time after the bolt has been tightened), which equals, force in each bolt at t (time before bolt has been tightened) plus C (the constants of proportionality) multiplied by tightening at t, where time t+1 represents the next instant to t. In some embodiments, a matrix of constants of proportionality, based on experimental results, is used to determine the simulated force values. The matrix is reproduced below.

$$\begin{bmatrix} F_1 \\ F_2 \\ F_3 \\ F_4 \\ F_5 \\ F_6 \\ F_7 \\ F_8 \end{bmatrix}_{t+1} = \begin{bmatrix} F_1 \\ F_2 \\ F_3 \\ F_4 \\ F_5 \\ F_6 \\ F_7 \\ F_8 \end{bmatrix}_t + \begin{bmatrix} 1 & C_{12} & 0 & 0 & 0 & 0 & 0 & C_{18} \\ C_{21} & 1 & C_{23} & 0 & 0 & 0 & 0 & 0 \\ 0 & C_{32} & 1 & C_{34} & 0 & 0 & 0 & 0 \\ 0 & 0 & C_{43} & 1 & C_{45} & 0 & 0 & 0 \\ 0 & 0 & 0 & C_{54} & 1 & C_{56} & 0 & 0 \\ 0 & 0 & 0 & 0 & C_{65} & 1 & C_{67} & 0 \\ 0 & 0 & 0 & 0 & 0 & C_{76} & 1 & C_{78} \\ C_{81} & 0 & 0 & 0 & 0 & 0 & C_{87} & 1 \end{bmatrix} \times \begin{bmatrix} \Delta F_1 \\ \Delta F_2 \\ \Delta F_3 \\ \Delta F_4 \\ \Delta F_5 \\ \Delta F_6 \\ \Delta F_7 \\ \Delta F_8 \end{bmatrix}_t$$

In some embodiments, the constants $C_{ij}$ are defined based on actual, experimental data. In some embodiment, $C_{ij}$ is defined as the ratio of how much the force on bolt "i" alters as bolt "j" is tightened. In some embodiments, these constants also inherit the errors of the collected data, such as differences in bolt lubrication, which affects the transmitted force, and strain gauge inaccuracies. In some embodiments, the bolts' interaction force values are not the same for symmetric bolts (e.g., bolts adjacent to the first bolt that was tightened). In some embodiments, the symmetric bolts have the same simulated force values. In some embodiments, a time plurality of the actual flange tightening is considered. In some embodiments, the elements of the matrix, presented above, are extracted from experimental results, and the signal to noise ratio is then reduced, considering each interaction, for better analysis. In one or more embodiments, different gasket materials produce different signals and/or constants of proportionality.

Figure 10:
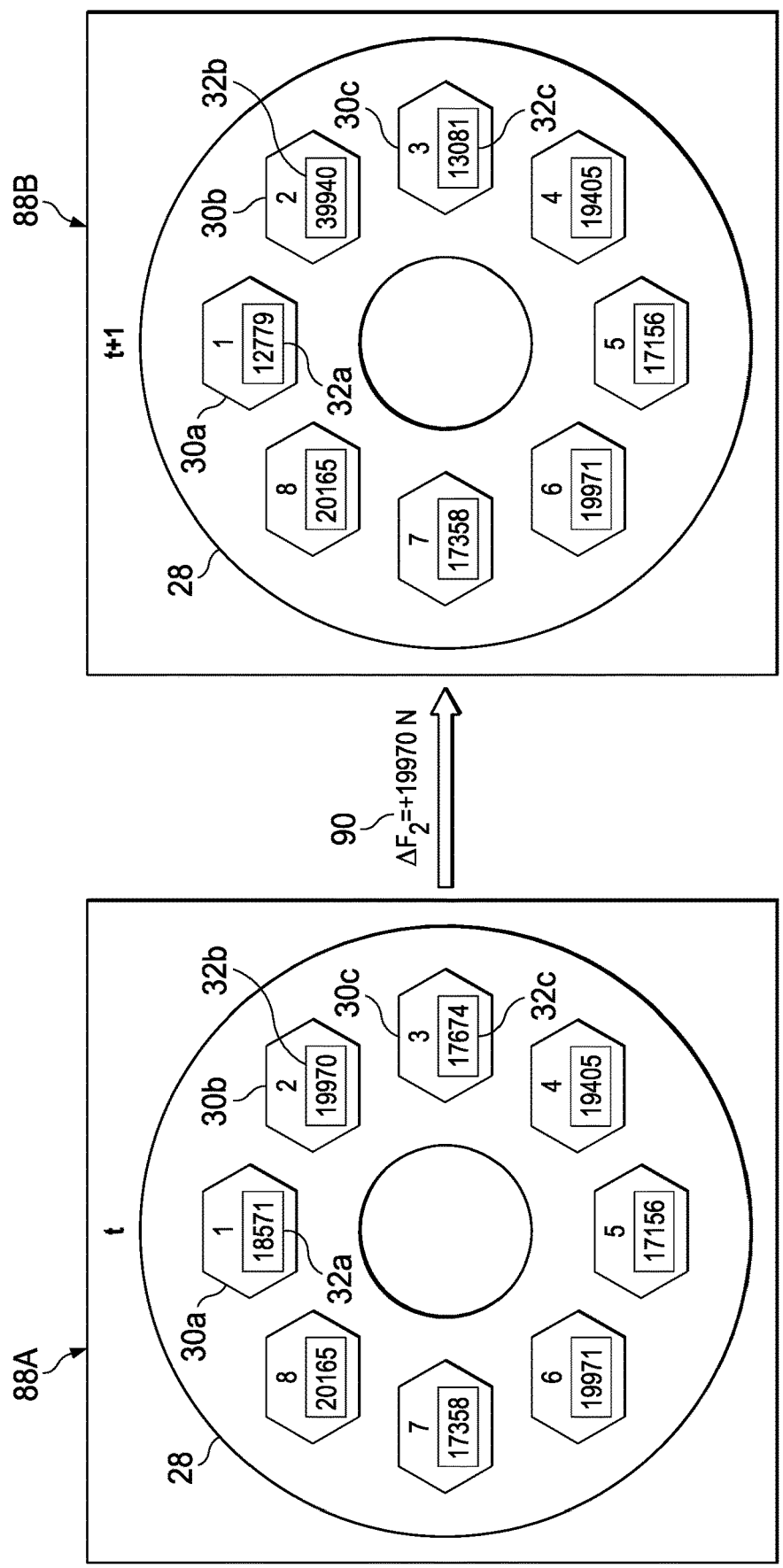
FIG. 10 is a diagrammatic illustration of the flange assembly of FIG. 1 portraying elastic interaction, according to one or more embodiments of the present disclosure.

FIG. 10 also relates to displaying elastic interaction between the plurality of bolts 30. FIG. 10 shows two frames 88A and 88B, respectively, to demonstrate the change between prior to bolt "2" 30b being tightened and after bolt "2" 30b is tightened. Frame 88A shows time=t, the time prior to the user selecting bolt "2" 30b to be selected for tightening. In Frame 88A, bolt "1" 30a and bolt "3" 30c are beside bolt "2" 30b. Stress value boxes 32a, 32b, and 32c show the force and/or stress for bolts 30a, 30b, and 30c, respectively. A value 90 shows the force that was applied to bolt "2" 30*b* when it was selected to be tightened. In this example, value 90 reads that an additional 19,970 N was applied to bolt "2" 30*b*. Frame 88B shows time=t+1, the time after bolt "2" 30*b* has been tightened. In Frame 88B, bolt "2" 30*b* has been tightened and as a result the value in the stress value box 32*b* has increased; bolt "1" 30*a* and bolt "3" 30*c* have not been tightened but as a result of 30*b* being tightened the values in stress value boxes 32*a* and 32*c*, respectively, have decreased as a result of elastic interactions. In some embodiments, the aforementioned matrix and equation are used to determine the stress values for the stress value box 32*a*, 32*b*, and 32*c*. In one or more embodiments, the bar plot 50 also displays the elastic interaction, since the bar plot 50 displays each bolt stress side by side in columns and is updated automatically each time bolts are tightened or loosened.

In one or more embodiments, method 86 includes a further step which models the stair effect. The stair effect occurs when a bolt is tightened, which causes the adjacent bolts to decrease in force and the bolt nearest to the latter to increase in force, or alternatively, when a bolt is loosened, its adjacent bolts increase in force. For example, if bolt 30*c* is tightened, the value in the stress value box 32*b* for bolt 30*b* will decrease, and as the value for the stress value box 32*b* decreases, the value in the stress value box 32*a* for bolt 30*a* will increase.

Figure 11:
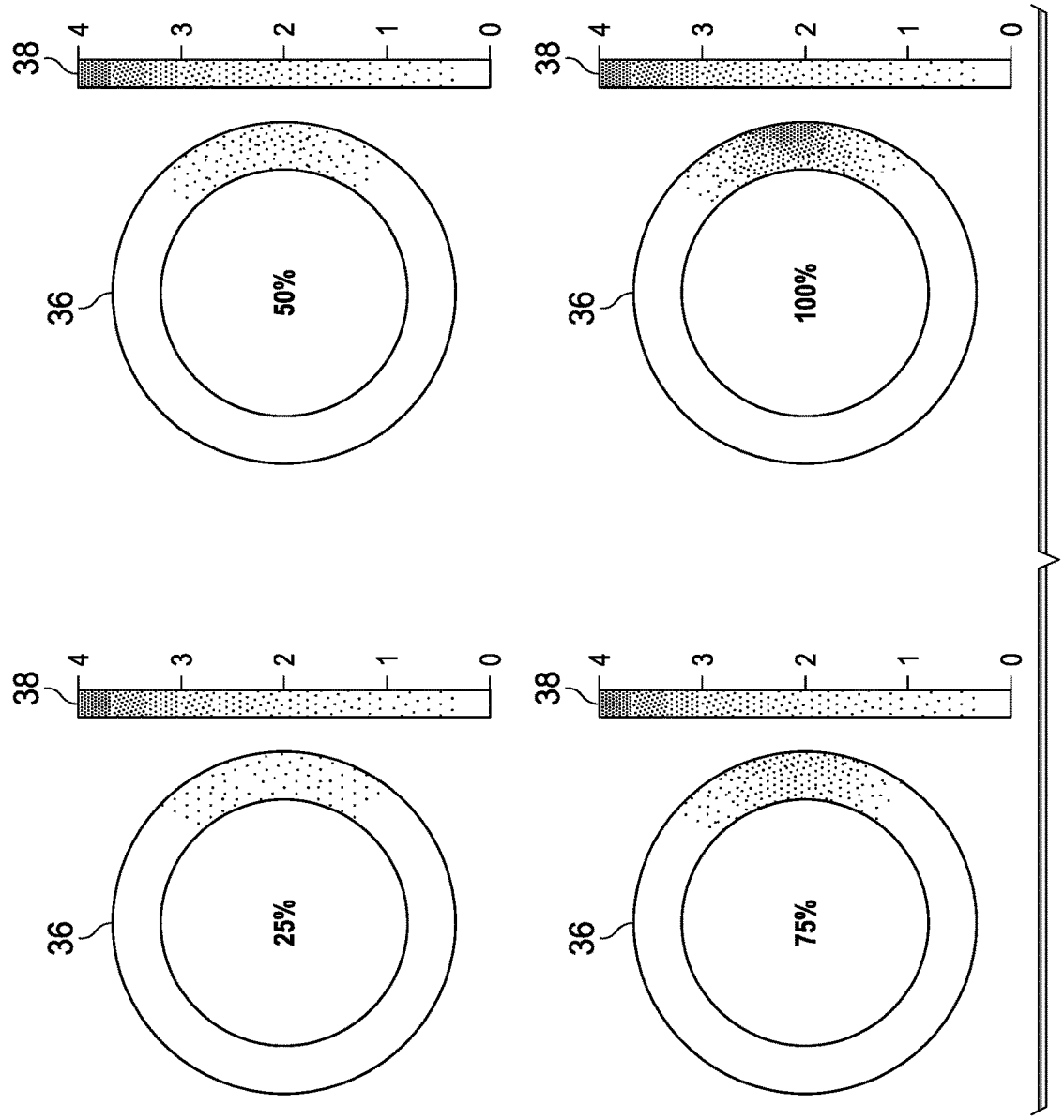
FIG. 11 is a diagrammatic illustration of the gasket stress distribution ring of FIG. 1 at various stages of tightening for a single bolt, according to one or more embodiments of the present disclosure.

The simulator 10 may also take into account the flange rotation effect. As shown in FIG. 11, in one or more embodiments, the flange rotation effect, in which the flange concentrates the stress on the outside diameter due to the rotation effect, is also considered in the model. In some embodiments, the bolt and gasket stresses are continuously changing over time to simulate the gasket stress relaxation effect. The gasket stress relaxation effect is often referred to as, the creep effect. When a force is applied to a gasket, its viscoelastic properties may cause the material to deform over time, which can cause the bolts to relax, which is the creep effect.

In some embodiments and after or at step the 78, the user 18 may select the show gasket stress icon 34 to visually show the gasket stress. At the step 79*a*, the assembly training determines if the show gasket stress icon 34 has been pressed. In some embodiments, the gasket stress distribution ring 36 automatically shows the user 18 the change in stress and a button is not required to be selected. In some embodiments, a bilinear interpolation technique is used to visually represent the gasket profile, where four nodes of each element are sufficient to define the intermediary values. These values are displayed in a color scheme that encompasses a gradient from blue to cyan, green, yellow, orange, and red. In some embodiments, the bilinear interpolated rectangles (made from the four nodes) are positioned in a circle to create a gasket shape. In some embodiments, a boundary condition for each rectangle is set to create a continuity effect through the circle, and the edges of each rectangle must match in value with the edges of the next rectangle in the line. As shown in FIG. 11, the intensity of the colors of the gasket stress distribution ring 36 change based on tightening percentages (25%, 50%, 75%, and 100% respectively), and the gasket stress bar 38 provides a key to show low to high stress values based on a set color scheme. FIG. 11 shows one bolt being tightened and the gradual stress distribution on the gasket from the point of maximum stress (i.e., maximum allowed stress) to the regions of lower stress where no bolts are tightened. In some embodiments, the blue side of the visible light spectrum represents no to low stress, while the red side of the visible light spectrum represents high stress. In some embodiments, the blue side of the visible light spectrum represents high stress, while the red side of the spectrum represents low stress. In one or more embodiments, a finite element model was created to evaluate the stress provided when one or more bolts from the plurality of bolts are tightened. In some embodiments, the show gasket stress icon 34 may be pressed at any time in method 86.

In one or more embodiments, at the step 79*c*, the user 18 may select the leak test icon 62 to simulate a leak test. The simulator 10 takes into account whether the leak test icon 62 has been pressed. If the leak test icon 62 has been pressed, step 79*d*, in some embodiments, occurs; and the assembly training takes into account bolt forces and media pressure to determine gasket stress when conducting the leak test. At this point, in some embodiments, the stress value box 32 will change colors to determine whether a leak occurred at that specific region. Each of the stress value boxes 32 change colors to inform the user 18 whether that configuration corresponds to a leakage or not, indicated by the colors red or green, respectively. If a leak occurred, the box will be colored red. If no leak occurred, the box will be colored green. In one or more embodiments, when the user selects a bolt after selecting the leak test, the background color of the bolt turns to its original appearance. In some embodiments, when the user 18 selects a bolt after selecting the leak test, the background changes to grey. In some embodiments, a separate indicator may be used to determine if there is a leak, after selecting the leak test. In one or more embodiments, the pressure drop caused by the leak is displayed.

In one or more embodiments, if the there is a leakage at the step 79*d* and the start button icon has been pressed and the non-adjustable parameters locked, the user 18 is given a failure score for this establishes an irreversible faulty mistake. In case the start button icon 54 has been pressed and the non-adjustable parameters locked, then after steps 80 and 82 the simulator 10 will determine if the tightening pattern has been completed, moving the simulator 10 to a step 84. In some embodiments, the leak test icon 62 may be pressed at any time in method 86.

In case the start button icon 54 has been pressed and the non-adjustable parameters locked, then after steps 80 and 82 the simulator 10 will determine if the tightening pattern has been completed, moving the simulator 10 to a step 84. In some embodiments, the score is displayed after step 84.

Figure 12:
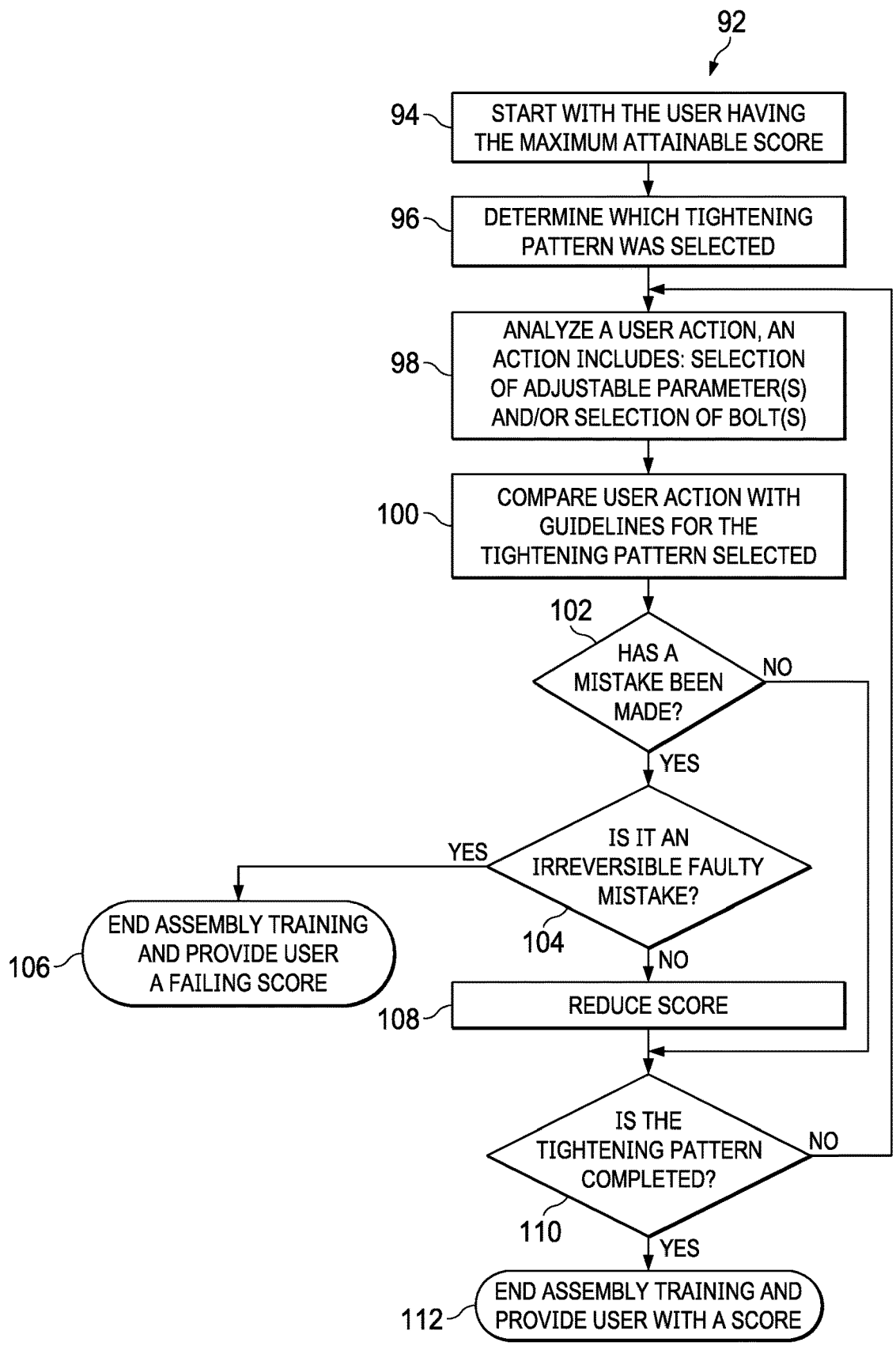
FIG. 12 is a flow chart displaying a scoring system, according to one or more embodiments.

FIG. 12 displays one embodiment of a scoring method 92. In some embodiments, the scoring method 92 may occur after or contemporaneously with method 70 or method 86. In some embodiments the scoring only begins after the start button icon 54 was pressed, method 92 begins with a step 94 with the user 18 having a maximum attainable score, determining which tightening pattern was selected at a step 96, analyzing a user action at a step 98, where the action includes: selection of adjustable parameter(s) and/or selection of bolt(s), comparing the user action with guidelines for the tightening pattern selected at a step 100, and then determining if a mistake has been made at a step 102. Step 102 asks "has a mistake been made?" If yes, then the next question is a step 104: "Is it an irreversible faulty mistake?" If yes, then the assembly training ends, and the user is provided a failing score at a step 106. If it was not an irreversible mistake but a minor mistake, then the score is reduced at a step 108. Once the score is reduced, the next step is to determine if the tightening pattern is completed at a step 110. If so, the assembly training is ended, and the user is presented with a reduced score (in case a mistake has been made) from the possible maximum attainable score at a step 112. If the tightening pattern was not completed at the step 110, then the method repeats starting again after step 96. Likewise, if a mistake was not made at step 102, then step 110 asks if a tightening pattern had been completed: if yes, then step 112 takes place, and if not, the method repeats starting again after step 96. The scoring method may occur contemporaneously with method 70 or method 86. In some embodiments, method 92 occurs after method 70 or method 86. The user action, in some embodiments, is or correlates to the user's actions in steps 74 and 78.

In some embodiments, tightening the incorrect bolt will reduce the overall score of the user 18. In some embodiments, selecting the incorrect torque wrench or wrench or the incorrect torque will reduce the score. In several embodiments, the further the user 18 is from selected tightening pattern, the lower the score will be. In some embodiments, the user 18 must follow the ASME® PCC-1 Guidelines for Pressure Boundary Bolted Flange Joint Assembly or the score will be reduced because the simulator 10 is comparing the inputs of the user 18 to this guideline.

In some embodiments, a score is displayed when the last bolt is selected. In several embodiments, no score is displayed, rather a pass/fail indication is displayed. In some embodiments, a score of 100 is the maximum, best score achievable by the user 18. In one or more embodiments, if the user 18 follows the correct tightening pattern and/or sequence and uses the correct applied torque values as defined by the ASME® PCC-1 Guidelines for Pressure Boundary Bolted Flange Joint Assembly, then the user 18 scores a 100. In some embodiments, the simulator 10 uses its own set of guidelines to define a perfect and/or passing score. In some embodiments, the applied torque values only must be in a range of acceptable values in order to pass and/or get the maximum set of points. In some embodiments, the irreversible faulty mistake includes crushing the gasket, yielding the bolts, conducting a leak test prior to reaching the minimum gasket sealing stress, etc. In one or more embodiments, the irreversible faulty mistake is an action taken by the user 18 that cannot be fixed and/or repaired in the assembly training. In some embodiments, the irreversible faulty mistake is an action taken by the user 18 that prevents the tightening pattern from being completed.

In some embodiments, during the execution of the method 70, the method 86, or during the operation of the simulator 10, the user 18 may select the reset button 64 to reset all the parameters (e.g., gasket and bolt stresses, gasket type, pressure value, torque value, etc.) of the simulator 10. The reset button 64 may simulate starting the assembly training over. By selecting the reset button 64, all values are reset including but not limited to: gasket type, gasket stress, torque, pressure, and bar plots. In some embodiments, the user 18 may select the start button icon 54 to start the assembly training again. In some embodiments, the user 18 may select a new tightening pattern and/or other parameters to begin the assembly training again.

In some embodiments, during the execution of the method 70, the method 86, or during the operation of the simulator 10, the user 18 may select or input the particular nut factor, which simulates the bolt lubricant coefficient of friction, using the nut factor icon 56. The torque to force relation of all bolts is affected by the K value. The K value establishes how efficiently the torque is converted into axial force on the bolt. Therefore, the lower the K factor the more efficient the torque to force transmission.

In one or more embodiments, during the execution of the method 70, the method 86, or during the operation of the simulator 10, the user 18 selects a value on the torque wrench bar 44. The selected torque value shall be set on the torque wrench 42c, which will precisely transmit the chosen torque. Selecting too high of a value on the torque wrench bar 44 may result in gasket stress that is too high and result in structural failure of the bolts or the gasket. In some embodiments, the user 18 may select a wrench 42a and 42b, which shall have their values set according to the position of the pointer in relation to the bar 60 at the moment the bolt of the plurality of bolts 30 is being clicked or pressed. This uncertain torque value represents the unpredictable torque that a person might execute on a real flange bolt when using a common wrench. In some embodiments, the tightening torque values are selected by the user 18. The user 18 may move a pointer along the bar 60 to set the tightening torque values. In some embodiments, as the pointer gets closer to the ends of the bar 60, its associated numeric value increases. In some embodiments, a color scale is used in the bar 60 where warm colors (e.g., yellow, red, etc.) represent higher values and cool colors (e.g., green, cyan, etc.) represent lower values. Therefore, the user 18, in some embodiments, may select the incorrect torque tool 42 or may select the incorrect value on the torque wrench bar and/or select the wrong tightening force value and not properly complete the flange and gasket assembly training, thus obtaining a low training score.

Figure 13:
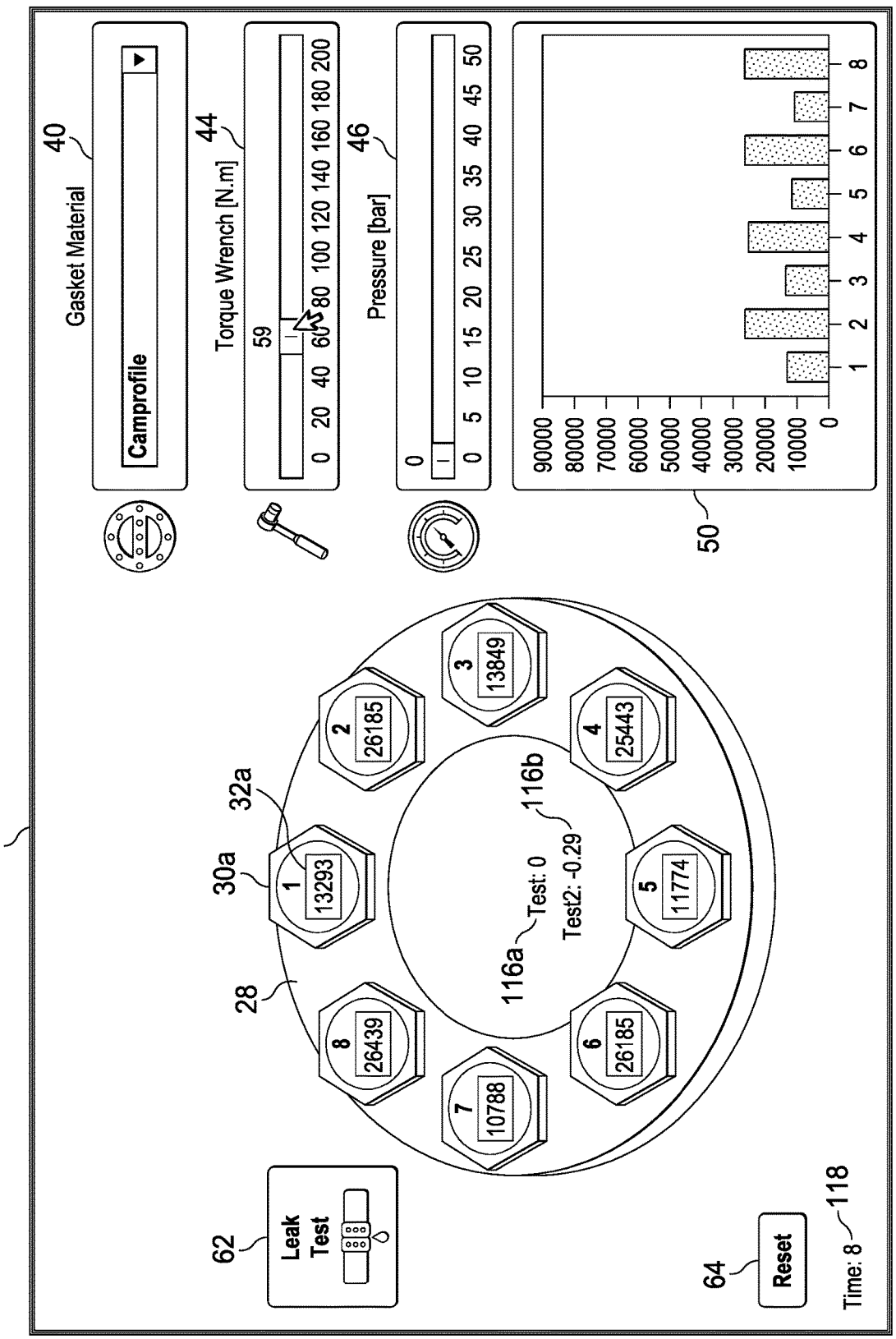
FIG. 13 is an illustration showing another embodiment of the window displayed on the GUI according to one or more embodiments of the present disclosure.

It is understood that variations may be made in the foregoing without departing from the scope of the invention. For example, referring to FIG. 13, window 16 according to one or more embodiments is shown in more detail and includes several components of the simulator 10 of FIG. 1, which components are given the same reference numerals. In the center of the flange 28, a test value 116a and test 2 value 116b update during the assembly training. The window 16 also includes an iteration value 118 that updates each time a bolt is selected such that the user may keep track of the number of iterations completed.

Figure 14:
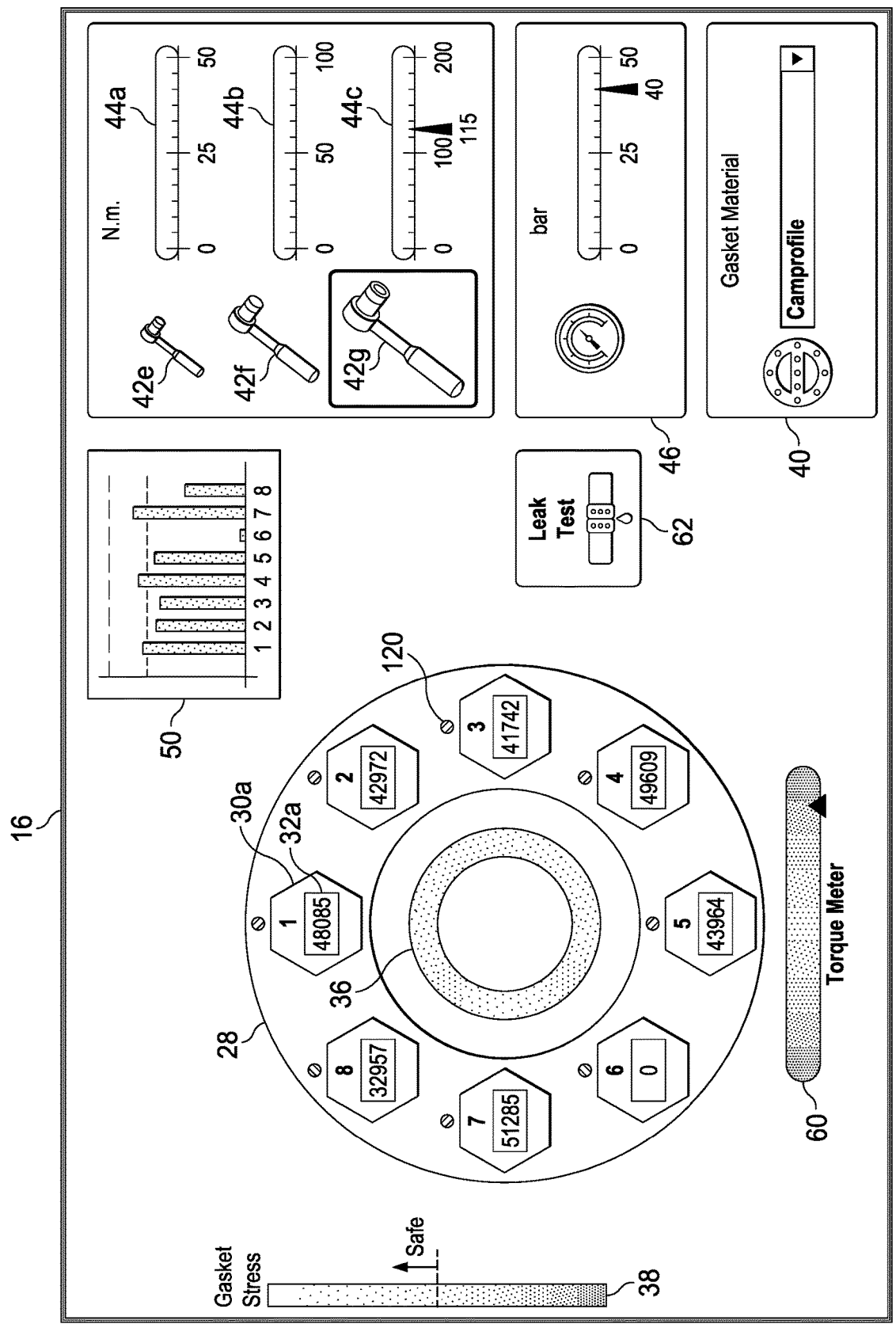
FIG. 14 is an illustration showing another embodiment of the window displayed on the GUI according to one or more embodiments of the present disclosure.

Referring to FIG. 14, window 16 according to one or more embodiments is shown in more detail and includes several components of the simulator 10 of FIG. 1, and these components are given the same reference numerals and thus no further detail will be described. The window 16 includes a color-coded indicator 120 placed above each bolt of the plurality of bolts that identifies a good or bad seal. The indicator 120 changes color to indicate a good or bad level of stress. In some embodiments, if the indicator 120 is green then the seal is good and will not leak, but if the indicator is red that indicates a bad seal and leaks could occur. The window 16 also includes three selectable options of torque tools: small torque tool 42e, medium torque tool 42f, and large torque tool 42g. Each torque tool has the torque wrench bar 44a, 44b, and 44c, where the torque wrench bar 44a, 44b, and 44c, respectively, has a selectable torque value. The torque value for the assembly training is set using the torque wrench bar 44a, 44b, and 44c, respectively, with a slidable bar. The window 16 includes the bar 60 which shows whether the selected torque tool 42e, 42f, and 42g and selected torque is optimal for tightening the bolt.

Referring to FIGS. 1-5 and FIGS. 13-14, in some embodiments, various aforementioned icons, widgets, plots, and the like may be presented in a different location, removed, duplicated, or added to the window 16 or presented on another window of the GUI 14.

In one or more embodiments, the computer 12 includes the GUI 14, a computer processor, and a computer readable medium operably coupled thereto. Instructions accessible to, and executable by the computer processor are stored on the computer readable medium. A database is also stored in the computer readable medium. Generally, the GUI 14 may display a plurality of windows 16 to the user. The computer 12 also may include an input device and an output device. In several example embodiments, the input device and the output device of the computer 12 are the GUI 14.

In some embodiments, the flange 28, plurality of bolts 30, and torque tools 42 are not icons, but physical equipment that are attached to the simulator 10. Therefore, the user 18 may physically choose the torque tool and tighten the bolts to simulate a gasket and flange assembly. In one or more embodiments, a torque tool 42 and/or a torque transducer 42*d* is operably connected to the computer 12. In some embodiments, the torque tool 42 and the torque transducer 42*d* is connected to the computer through a USB or similar device. In some embodiments, the torque transducer 42*d* is used to set torque and tighten a physical bolt from the plurality of bolts 30 using a physical flange and physical bolt of the plurality of bolts, which is operably coupled to the simulator 10. In some embodiments, the physical flange and physical bolt are associated with the flange 28 and a bolt of the plurality of bolts 30 displayed on the GUI. In some embodiments, the input device of the computer 12 is the physical equipment. In some embodiments, a virtual reality headset is provided for use with the assembly training. In some embodiments, the computer 12 is, or includes, a telephone, a personal computer, an untethered virtual reality headset, a mobile phone, a personal digital assistant, other types of telecommunication devices, other types of computing devices, and/or any combination thereof. In one or more embodiments, the computer 12 is operably coupled to a virtual reality headset. In one or more example embodiments, the computer 12 includes or is operably coupled to an application or an application server, which in several example embodiments, includes and/or executes one or more web-based programs, Intranet-based programs, and/or any combination thereof. In an example embodiment, the application includes a computer program including a plurality of instructions, data, and/or any combination thereof.

In some embodiments, the flange 28 is a pair of flanges 28*a* and 28*b*. In some embodiments, the pair of flanges is a pair of blind flanges. In some embodiments, the pair of flanges is a pair of blind flanges per American Society of Mechanical Engineers ("ASME®") B16.5 DN 4" class 150 #.

In some embodiments, the gasket style box 40 is an option menu button, that has a pull-down feature that allows the user 18 to select a gasket type. In some embodiments, the gasket style box 40 allows the user 18 to select from any one or more of the following: compressed fiber gaskets, metallic gaskets, spiral wound gaskets, camprofile gaskets, expanded polytetrafluoroethylene "PTFE" gaskets, restructured PTFE gaskets, and skived PTFE gaskets. In some embodiments, other gasket types may be included.

In one or more embodiments, bolt yield icon 58 is an option menu button that may allow the user 18 to specify the yield stress of the plurality of bolts 30. The bolt yield may influence the assembly training regarding the irreversible faulty mistake, when the user 18 executes a bolt stress higher than the bolt yield stress. In some embodiments, bolt yield is represented in units of kilopounds per square inch.

In some embodiments, the user 18 may select from the small wrench 42*a*, the larger wrench 42*b*, and the torque wrench 42*c*. In some embodiments, the user 18 selects the torque tool 42 to be used by pressing, clicking, or otherwise selecting an icon. In some embodiments, the torque of the torque wrench bar 44 is in foot pounds (ft-lb). In some embodiments, the torque of the torque wrench bar 44 is in Newton meter (Nm). In some embodiments, the torque wrench bar 44 is a line graph with a slidable bar that allows the user to select the torque. In some embodiments, the user 18 inputs a torque value. In some embodiments, each torque tool/wrench 42 has an individual torque tool and/or wrench bar 44. In some embodiments, the user 18 selects a torque value using a drop-down menu, by selecting a value on the torque wrench bar 44.

In some embodiments, the pressure inside the flange chamber is selected by moving a cursor. In some embodiments, the pressure is input manually by the user 18. In some embodiments, the pressure is selected from a drop-down menu. In some embodiments, pressure is measured in pounds per square inch (psi). In some embodiment, pressure is measured in Pascals. In some embodiments, pressure is measured in bar.

In some embodiments, the tightening pattern option menu 52 allows the user 18 to select a particular tightening pattern, which automatically defines its recommended tightening sequence and target torque ranges. In some embodiments, the tightening pattern is selected via a drop-down menu or selectable buttons. In some embodiments, the tightening patterns are described in the American Society of Mechanical Engineers ("ASME®") PCC-1 Guidelines for Pressure Boundary Bolted Flange Joint Assembly or a similar guideline published by the ASME. In some embodiments, the tightening pattern is selected automatically and without input from the user 18.

In several embodiments, the simulator 10 includes an arrangement of elements that is a technical improvement over previous ways of training flange and gasket assembly. The simulator 10 is a technical solution to problems associated with simulating and/or training in flange and gasket assembly. The simulator 10 has features such as showing gasket stress and a leak test to provide the user 18 with insight (via a visual representation) into how well the user 18 is performing the assembly training. Further, the simulator 10 allows the user to change gasket types and tightening patterns, among other parameters, which provides for a greater breadth of training. In several embodiments, the simulator 10 scores the user 18 in accordance with industry standard guidelines, which allows the user 18 to know how well the user 18 did in completing the tightening pattern. Additionally, the ability of the simulator 10 to account for real-world interactions such as cross-interaction, elastic interaction, the stair effect, gasket stress relaxation (i.e., the creep effect), etc. provides for a better training experience. The ability to accurately model and test the user 18 in flange and gasket assembly is crucial, since improper assembly leads to leaks, costly losses, and/or dangerous accidents. As such, method 70 and/or simulator 10 involve a practical application of training and simulating flange and gasket assembly.

Figure 15:
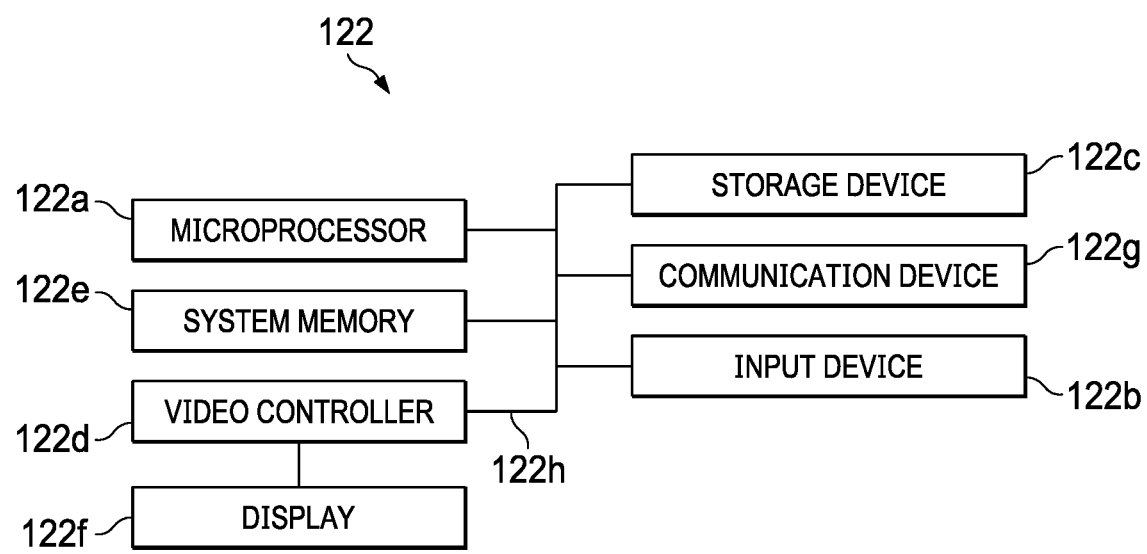
FIG. 15 is a diagrammatic illustration of a computing device, or node, for implementing one or more example embodiments of the present disclosure, according to an example embodiment.

Referring to FIG. 15, with continuing reference to FIGS. 1-14, an illustrative node 122 for implementing one or more of the embodiments of one or more of the controllers(s) (e.g., the computer 12), element(s), apparatus, system(s) (e.g., the simulator 10), method(s) (e.g., the method 70), step(s), and/or sub-step(s), or any combination thereof, described above and/or illustrated in FIGS. 1 through 14 is depicted. The node 122 includes a microprocessor 122*a*, an input device 122*b*, a storage device 122*c*, a video controller 122*d*, a system memory 122*e*, a display 122*f*, and a communication device 122*g* all interconnected by one or more buses 122*h*. In one or more embodiments, the storage device 122*c* may include a hard drive, CD-ROM, optical drive, any other form of storage device and/or any combination thereof. In one or more embodiments, the storage device 122c may include, and/or be capable of receiving, a CD-ROM, DVD-ROM, or any other form of non-transitory computer-readable medium that may contain executable instructions. In one or more embodiments, the communication device 122g may include a modem, network card, or any other device to enable the node 122 to communicate with other node(s). In one or more embodiments, the node and the other node(s) represent a plurality of interconnected (whether by intranet or Internet) computer systems, including without limitation, personal computers, mainframes, PDAs, smartphones and cell phones.

One or more of the embodiments described above and/or illustrated in FIGS. 1-14 include at least the node 122 and/or components thereof, and/or one or more nodes that are substantially like the node 122 and/or components thereof. In one or more embodiments, one or more of the above-described components of the node 122 and/or the embodiments described above and/or illustrated in FIGS. 1-14 include respective pluralities of these same components. In several embodiments, the computer 12 includes a plurality of computers, which, in some embodiments, include one or more nodes 122.

One or more of the embodiments described above and/or illustrated in FIGS. 1-14 include a computer program that includes a plurality of instructions, data, and/or any combination thereof; an application written in, for example, Arena, HyperText Markup Language (HTML), Cascading Style Sheets (CSS), JavaScript, Python, Extensible Markup Language (XML), asynchronous JavaScript and XML (Ajax), and/or any combination thereof; a web-based application written in, for example, Java or Adobe Flex, which in one or more embodiments pulls real-time information from one or more servers, automatically refreshing with latest information at a predetermined time increment; or any combination thereof.

In one or more embodiments, a computer system typically includes at least hardware capable of executing machine readable instructions, as well as the software for executing acts (typically machine-readable instructions) that produce a desired result. In one or more embodiments, a computer system may include hybrids of hardware and software, as well as computer sub-systems.

In one or more embodiments, hardware generally includes at least processor-capable platforms, such as client-machines (also known as personal computers or servers), and hand-held processing devices (such as smart phones, tablet computers, or personal computing devices (PCDs), for example). In one or more embodiments, hardware may include any physical device that is capable of storing machine-readable instructions, such as memory or other data storage devices. In one or more embodiments, other forms of hardware include hardware sub-systems, including transfer devices such as modems, modem cards, ports, and port cards, for example.

In one or more embodiments, software includes any machine code stored in any memory medium, such as RAM or ROM, and machine code stored on other devices (such as floppy disks, flash memory, or a CD-ROM, for example). In one or more embodiments, software may include source or object code. In one or more embodiments, software encompasses any set of instructions capable of being executed on a node such as, for example, on a client machine or server.

In one or more embodiments, combinations of software and hardware could also be used for providing enhanced functionality and performance for certain embodiments of the present disclosure. In an embodiment, software functions may be directly manufactured into a silicon chip. Accordingly, combinations of hardware and software are also included within the definition of a computer system and are thus envisioned by the present disclosure as possible equivalent structures and equivalent methods.

In one or more embodiments, computer readable mediums include, for example, passive data storage, such as a random-access memory (RAM) as well as semi-permanent data storage such as a compact disk read only memory (CD-ROM). One or more embodiments of the present disclosure may be embodied in the RAM of a computer to transform a standard computer into a new specific computing machine. In one or more embodiments, data structures are defined organizations of data that may enable an embodiment of the present disclosure. In an embodiment, a data structure may provide an organization of data, or an organization of executable code.

In one or more embodiments, any networks and/or one or more portions thereof may be designed to work on any specific architecture. In an embodiment, one or more portions of any networks may be executed on a single computer, local area networks, client-server networks, wide area networks, internets, hand-held and other portable and wireless devices and networks.

In one or more embodiments, a database may be any standard or proprietary database software. In one or more embodiments, the database may have fields, records, data, and other database elements that may be associated through database specific software. In one or more embodiments, data may be mapped. In one or more embodiments, mapping is the process of associating one data entry with another data entry. In an embodiment, the data contained in the location of a character file can be mapped to a field in a second table. In one or more embodiments, the physical location of the database is not limiting, and the database may be distributed. In an embodiment, the database may exist remotely from the server, and run on a separate platform. In an embodiment, the database may be accessible across the Internet. In one or more embodiments, more than one database may be implemented.

In one or more embodiments, a plurality of instructions stored on a non-transitory computer readable medium may be executed by one or more processors to cause the one or more processors to carry out or implement in whole or in part one or more of the embodiments illustrated in FIGS. 1 through 14. In one or more embodiments, such a processor may include one or more of the microprocessor 122a, any processor(s) that are part of the components of the above-described systems, such as, for example, the computer 12, the simulator 10, and/or any combination thereof, and such a computer readable medium may be distributed among one or more components of the system. In one or more embodiments, such a processor may execute the plurality of instructions in connection with a virtual computer system. In one or more embodiments, such a plurality of instructions may communicate directly with the one or more processors, and/or ay interact with one or more operating systems, middleware, firmware, other applications, and/or any combination thereof, to cause the one or more processors to execute the instructions.

An apparatus is disclosed. The apparatus is configured to train a user in flange and gasket assembly, the apparatus includes a non-transitory computer readable medium having stored thereon a plurality of instructions, wherein the instructions are executed with one or more processors so that the following steps are executed: (i) displaying, on a graphical user interface ("GUI"), at least a portion of a flange joint for an assembly training; wherein the flange joint includes a pair of flanges with a gasket in between the pair of flanges; and wherein the pair of flanges are coupled together via a plurality of bolts; (ii) displaying, on the GUI, a plurality of selectable icons; wherein the selectable icons are associated with a plurality of parameters; and wherein the plurality of parameters include: pressure, torque, nut factor, bolt yield, gasket style, tightening tool type, or any combination thereof; (iii) receiving, by the GUI, a tightening pattern for the flange joint; wherein the tightening pattern automatically defines a recommended tightening sequence and target torque ranges; (iv) receiving, by the GUI, selection(s) of the selectable icons associated with the plurality of parameters; (v) receiving, by the GUI, a selected bolt from the plurality of bolts to be tightened, wherein the selected bolt may be chosen by the user in accordance with the tightening pattern; (vi) determining, and displaying on the GUI, simulated stress values related to tightening the selected bolt; and (vii) repeating at least steps (v) and (vi) until the tightening pattern is completed. In some embodiments, the instructions are executed with the one or more processors so that the following step is also executed: calculating elastic interaction(s) between the plurality of bolts; wherein the elastic interaction(s) are associated with tightening the selected bolt and determining the simulated stress values. In some embodiments, displaying the simulated stress values related to tightening the selected bolt includes: displaying an increase in the simulated stress value of the selected bolt; and displaying respective decreases in the simulated stress values of bolts adjacent the selected bolt. In one or more embodiments, displaying the simulated stress values related to tightening the selected bolt includes: displaying an increase in the simulated stress value of the selected bolt; and displaying an increase in the simulated stress value of the bolt directly opposite from the selected bolt. In some embodiments, the instructions are executed with the one or more processors so that the following step is also executed: determining a score for the assembly training: wherein the score is determined based on the tightening pattern; wherein the score is determined contemporaneously with at least step (v); and wherein the score is reduced when the user fails to follow the tightening pattern correctly. In some embodiments, the instructions are executed with the one or more processors so that the following step is also executed: ending the assembly training if the user makes an irreversible mistake; and providing a failing score; wherein the irreversible mistake is an action by the user that prevents the tightening pattern from being completed; and wherein the irreversible mistake is one or more of: crushing the gasket; yielding one or more bolts of the plurality of bolts; loosen the gasket; and conducting a leak test prior to reaching a required minimum gasket sealing stress. In one or more embodiments, the instructions are executed with the one or more processors so that the following step is also executed: displaying, on the GUI, a leak test icon; receiving, by the GUI, a selection of the leak test icon; simulating pressurization of the flange joint; determining, based on at least the simulated pressurization of the flange joint, an absence or a presence of a leak; and displaying, on the GUI, the absence or the presence of the leak. In one or more embodiments, the instructions are executed with the one or more processors so that the following step is also executed: displaying, on the GUI, a torque transducer selectable icon; receiving, on the GUI, a selection of the torque transducer selectable icon; and receiving, by the GUI, input from a physical torque transducer operably coupled thereto. In one or more embodiments, the instructions are executed with the one or more processors so that the following step is also executed: displaying, on the GUI, a show gasket stress icon; receiving, by the GUI, a selection of the show gasket stress icon; and displaying, on the GUI, a visual representation of stress on the gasket as one or more of the plurality of bolts are tightened. In some embodiments, displaying, on the GUI, a visual representation of the stress on the gasket as one or more of the plurality of bolts are tightened further includes: displaying a higher level of stress on an outer diameter of the gasket in the visual representation; and displaying a lower level of stress on an inner diameter of the gasket in the visual representation.

A method is also disclosed. The method, generally, includes: (i) displaying, on a graphical user interface ("GUI") of a computer, at least a portion of a flange joint for an assembly training; wherein the flange joint includes a pair of flanges with a gasket in between the pair of flanges; and wherein the pair of flanges are coupled together via a plurality of bolts; (ii) displaying, on the GUI, a plurality of selectable icons; wherein the selectable icons are associated with a plurality of parameters; and wherein the plurality of parameters include: pressure, torque, nut factor, bolt yield, gasket style, tightening tool type, or any combination thereof; (iii) receiving, by the GUI, a tightening pattern for the flange joint; wherein the tightening pattern automatically defines a recommended tightening sequence and target torque ranges; (iv) receiving, by the GUI, selection(s) of the selectable icons associated with the plurality of parameters; (v) receiving, by the GUI, a selected bolt from the plurality of bolts to be tightened, wherein the selected bolt may be chosen by the user in accordance with the tightening pattern; (vi) determining using the computer, and displaying on the GUI, simulated stress values related to tightening the selected bolt; and (vii) repeating at least steps (v) and (vi) until the tightening pattern is completed. The method, in some embodiments, further includes: calculating elastic interaction(s) between the plurality of bolts; wherein the elastic interaction(s) are associated with tightening the selected bolt and determining the simulated stress values.

In one or more embodiments, displaying the simulated stress values related to tightening the selected bolt includes: displaying an increase in the simulated stress value of the selected bolt; and displaying respective decreases in the simulated stress values of bolts adjacent the selected bolt. In some embodiments, displaying the simulated stress values related to tightening the selected bolt includes: displaying an increase in the simulated stress value of the selected bolt; and displaying an increase in the simulated stress value of the bolt directly opposite from the selected bolt. In some embodiments, the method further includes: determining, using the computer, a score for the assembly training: wherein the score is determined based on the tightening pattern; wherein score is determined contemporaneously with at least step (v); and wherein the score is reduced when the user fails to follow the tightening pattern correctly. In one or more embodiments, the method further includes: ending the assembly training if the user makes an irreversible mistake; and providing a failing score; wherein the irreversible mistake is an action by the user that prevents the tightening pattern from being completed; and wherein the irreversible mistake is one or more of: crushing the gasket; yielding one or more bolts of the plurality of bolts; loosen the gasket; and conducting a leak test prior to reaching a required minimum gasket sealing stress. In one or more embodiments, the method further includes: displaying, on the GUI, a leak test icon; receiving, by the GUI, a selection of the leak test icon; simulating pressurization of the flange joint; determining, based on at least the simulated pressurization of the flange joint, an absence or a presence of a leak; and displaying, on the GUI, the absence or the presence of the leak. In one or more embodiments, the method further includes: displaying, on the GUI, a torque transducer selectable icon; receiving, on the GUI, a selection of the torque transducer selectable icon; and receiving, by the GUI, input from a physical torque transducer operably coupled thereto. In some embodiments, the method further includes: displaying, on the GUI, a show gasket stress icon; receiving, by the GUI, a selection of the show gasket stress icon; and displaying, on the GUI, a visual representation of stress on the gasket as one or more of the plurality of bolts are tightened. In some embodiments, displaying, on the GUI, a visual representation of the stress on the gasket as one or more of the plurality of bolts are tightened further includes: displaying a higher level of stress on an outer diameter of the gasket in the visual representation; and displaying a lower level of stress on an inner diameter of the gasket in the visual representation.

A system is also disclosed. The system is configured to train a user in flange and gasket assembly, the system comprising a non-transitory computer readable medium having stored thereon a plurality of instructions, wherein the instructions are executed with one or more processors so that the following steps are executed: displaying, on a graphical user interface ("GUI"), at least a portion of a flange joint for an assembly training; wherein the flange joint includes a pair of flanges with a gasket in between the pair of flanges; and wherein the pair of flanges are coupled together via a plurality of bolts; displaying, on the GUI, a plurality of selectable icons, wherein the selectable icons are associated with a plurality of parameters; receiving, by the GUI, inputs from the user, wherein the inputs include: one or more parameters, and a bolt from the plurality of bolts to be tightened; comparing the inputs to a stored guideline; and scoring the user, including: determining whether the inputs and the stored guideline match; if the inputs and the stored guideline do not match, then determining that a mistake has been made by the user and reducing the score of the user; and if the inputs and the stored guideline match, then either maintaining the score of the user or increasing the score of the user. In one or more embodiments, the instructions are executed with the one or more processors so that the following step is also executed: providing the user with a failing score if the inputs and the stored guideline do not match and the mistake cannot be corrected; and ending the assembly training if the inputs and the stored guideline do not match and the mistake cannot be corrected; and wherein the mistake that cannot be corrected is one or more of: crushing the gasket; yielding one or more bolts of the plurality of bolts; loosen the gasket; and conducting a leak test prior to reaching a required minimum gasket sealing stress. In some embodiments, the instructions are executed with the one or more processors so that the following step is also executed: displaying, on the GUI, a leak test icon; receiving, by the GUI, a selection of the leak test icon; simulating pressurization of the flange joint; determining, based on at least the simulated pressurization of the flange joint, an absence or a presence of a leak; and displaying, on the GUI, the absence or the presence of the leak. In some embodiments, the one or more parameters include: pressure, torque, nut factor, bolt yield, gasket style, tightening tool type, or any combination thereof. In one or more embodiments, the instructions are executed with the one or more processors so that the following step is also executed: displaying, on the GUI, a torque transducer selectable icon; receiving, on the GUI, a selection of the torque transducer selectable icon; and receiving, by the GUI, input from a physical torque transducer operably coupled thereto. In some embodiments, the instructions are executed with the one or more processors so that the following step is also executed: calculating simulated stress values for the plurality of bolts, respectively; updating and displaying the simulated stress values; and updating and displaying a visual representation of stress on the gasket as one or more of the plurality of bolts are tightened. In one or more embodiments, displaying a visual representation of the stress on the gasket as one or more of the plurality of bolts are tightened further includes: displaying a higher level of stress on an outer diameter of the gasket in the visual representation; and displaying a lower level of stress on an inner diameter of the gasket in the visual representation. In one or more embodiments, displaying the simulated stress values further includes: displaying an increase in the simulated stress value of the selected bolt; wherein the selected bolt is one of the inputs; and displaying an increase in the simulated stress value of the bolt directly opposite from the selected bolt. In one or more embodiments, the instructions are executed with the one or more processors so that the following step is also executed: calculating elastic interaction(s) between the plurality of bolts; wherein the elastic interaction(s) are associated with tightening the selected bolt and determining the simulated stress values; wherein the selected bolt is one of the inputs. In some embodiments, displaying the simulated stress values related to tightening the selected bolt includes: displaying an increase in the simulated stress value of the selected bolt; and displaying respective decreases in the simulated stress values of bolts adjacent the selected bolt.

It is understood that variations may be made in the foregoing without departing from the scope of the present disclosure.

In several embodiments, the elements and teachings of the various embodiments may be combined in whole or in part in some (or all) of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several embodiments, while different steps, processes, and procedures are described as appearing as distinct acts, one or more of the steps, one or more of the processes, and/or one or more of the procedures may also be performed in different orders, simultaneously and/or sequentially. In several embodiments, the steps, processes, and/or procedures may be merged into one or more steps, processes and/or procedures.

In several embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. An apparatus configured to train a user in flange and gasket assembly, the apparatus comprising a non-transitory computer readable medium having stored thereon a plurality of instructions, wherein the instructions are executed with one or more processors so that the following steps are executed:
   (i) displaying, on a graphical user interface ("GUI"), at least a portion of a flange joint for an assembly training;
      wherein the flange joint comprises a pair of flanges with a gasket in between the pair of flanges; and
      wherein the pair of flanges are coupled together via a plurality of bolts;
   (ii) displaying, on the GUI, a plurality of selectable icons;
      wherein the selectable icons are associated with a plurality of parameters; and
      wherein the plurality of parameters include: pressure, torque, nut factor, bolt yield, gasket style, tightening tool type, or any combination thereof;
   (iii) receiving, by the GUI, a tightening pattern for the flange joint;
      wherein the tightening pattern defines a recommended tightening sequence and target torque ranges, automatically;
   (iv) receiving, by the GUI, selection(s) of the selectable icons associated with the plurality of parameters;
   (v) receiving, by the GUI, a selected bolt from the plurality of bolts to be tightened, wherein the selected bolt may be chosen by the user in accordance with the tightening pattern;
   (vi) determining, and displaying on the GUI, simulated stress values related to tightening the selected bolt; and
   (vii) repeating at least steps (v) and (vi) until the tightening pattern is completed.

2. The apparatus of claim 1, wherein the instructions are executed with the one or more processors so that the following step is also executed:
   calculating elastic interaction(s) between the plurality of bolts;
      wherein the elastic interaction(s) are associated with tightening the selected bolt and determining the simulated stress values.

3. The apparatus of claim 2, wherein displaying the simulated stress values related to tightening the selected bolt comprises:
   displaying an increase in the simulated stress value of the selected bolt; and
   displaying respective decreases in the simulated stress values of bolts adjacent the selected bolt.

4. The apparatus of claim 1, wherein displaying the simulated stress values related to tightening the selected bolt comprises:
   displaying an increase in the simulated stress value of the selected bolt; and
   displaying an increase in the simulated stress value of the bolt directly opposite from the selected bolt.

5. The apparatus of claim 1, wherein the instructions are executed with the one or more processors so that the following step is also executed:
   determining a score for the assembly training:
      wherein the score is determined based on the tightening pattern;
      wherein the score is determined contemporaneously with at least step (v); and
      wherein the score is reduced when the user fails to follow the tightening pattern correctly.

6. The apparatus of claim 4, wherein the instructions are executed with the one or more processors so that the following steps are also executed:
   ending the assembly training if the user makes an irreversible mistake; and
   providing a failing score;
   wherein the irreversible mistake is an action by the user that prevents the tightening pattern from being completed; and
   wherein the irreversible mistake is one or more of:
      crushing the gasket;
      yielding one or more bolts of the plurality of bolts;
      loosen the gasket; and
      conducting a leak test prior to reaching a required minimum gasket sealing stress.

7. The apparatus of claim 1, wherein the instructions are executed with the one or more processors so that the following steps are also executed:
   displaying, on the GUI, a leak test icon;
   receiving, by the GUI, a selection of the leak test icon;
   simulating pressurization of the flange joint;
   determining, based on at least the simulated pressurization of the flange joint, an absence or a presence of a leak; and
   displaying, on the GUI, the absence or the presence of the leak.

8. The apparatus of claim 1, wherein the instructions are executed with the one or more processors so that the following step are also executed:
   displaying, on the GUI, a torque transducer selectable icon;
   receiving, on the GUI, a selection of the torque transducer selectable icon; and
   receiving, by the GUI, input from a physical torque transducer operably coupled thereto.

9. The apparatus of claim 1, wherein the instructions are executed with the one or more processors so that the following step are also executed:
   displaying, on the GUI, a show gasket stress icon;
   receiving, by the GUI, a selection of the show gasket stress icon; and
   displaying, on the GUI, a visual representation of stress on the gasket as one or more of the plurality of bolts are tightened.

10. The apparatus of claim 9, wherein displaying, on the GUI, a visual representation of the stress on the gasket as one or more of the plurality of bolts are tightened further comprises:

displaying a higher level of stress on an outer diameter of the gasket in the visual representation; and displaying a lower level of stress on an inner diameter of the gasket in the visual representation.

11. A method of training a user in flange and gasket assembly, the method comprising:
(i) displaying, on a graphical user interface ("GUI") of a computer, at least a portion of a flange joint for an assembly training;
    wherein the flange joint comprises a pair of flanges with a gasket in between the pair of flanges; and
    wherein the pair of flanges are coupled together via a plurality of bolts;
(ii) displaying, on the GUI, a plurality of selectable icons;
    wherein the selectable icons are associated with a plurality of parameters; and
    wherein the plurality of parameters include: pressure, torque, nut factor, bolt yield, gasket style, tightening tool type, or any combination thereof;
(iii) receiving, by the GUI, a tightening pattern for the flange joint;
    wherein the tightening pattern defines a recommended tightening sequence and target torque ranges, automatically;
(iv) receiving, by the GUI, selection(s) of the selectable icons associated with the plurality of parameters;
(v) receiving, by the GUI, a selected bolt from the plurality of bolts to be tightened, wherein the selected bolt may be chosen by the user in accordance with the tightening pattern;
(vi) determining, using the computer, and displaying, on the GUI, simulated stress values related to tightening the selected bolt; and
(vii) repeating at least steps (v) and (vi) until the tightening pattern is completed.

12. The method of claim 11, further comprising:
calculating elastic interaction(s) between the plurality of bolts;
wherein the elastic interaction(s) are associated with tightening the selected bolt and determining the simulated stress values.

13. The method of claim 12, wherein displaying the simulated stress values related to tightening the selected bolt comprises:
displaying an increase in the simulated stress value of the selected bolt; and
displaying respective decreases in the simulated stress values of bolts adjacent the selected bolt.

14. The method of claim 11, wherein displaying the simulated stress values related to tightening the selected bolt comprises:
displaying an increase in the simulated stress value of the selected bolt; and
displaying an increase in the simulated stress value of the bolt directly opposite from the selected bolt.

15. The method of claim 11, further comprising:
determining, using the computer, a score for the assembly training:
wherein the score is determined based on the tightening pattern;
wherein score is determined contemporaneously with at least step (v); and
wherein the score is reduced when the user fails to follow the tightening pattern correctly.

16. The method of claim 11, further comprising:
ending the assembly training if the user makes an irreversible mistake; and
providing a failing score;
wherein the irreversible mistake is an action by the user that prevents the tightening pattern from being completed; and
wherein the irreversible mistake is one or more of:
crushing the gasket;
yielding one or more bolts of the plurality of bolts;
loosen the gasket; and
conducting a leak test prior to reaching a required minimum gasket sealing stress.

17. The method of claim 11, further comprising:
displaying, on the GUI, a leak test icon;
receiving, by the GUI, a selection of the leak test icon;
simulating pressurization of the flange joint;
determining, based on at least the simulated pressurization of the flange joint, an absence or a presence of a leak; and
displaying, on the GUI, the absence or the presence of the leak.

18. The method of claim 11, further comprising:
displaying, on the GUI, a torque transducer selectable icon;
receiving, on the GUI, a selection of the torque transducer selectable icon; and
receiving, by the GUI, input from a physical torque transducer operably coupled thereto.

19. The method of claim 11, further comprising:
displaying, on the GUI, a show gasket stress icon;
receiving, by the GUI, a selection of the show gasket stress icon; and
displaying, on the GUI, a visual representation of stress on the gasket as one or more of the plurality of bolts are tightened.

20. The method of claim 19, wherein displaying, on the GUI, a visual representation of the stress on the gasket as one or more of the plurality of bolts are tightened further comprises:
displaying a higher level of stress on an outer diameter of the gasket in the visual representation; and
displaying a lower level of stress on an inner diameter of the gasket in the visual representation.

\* \* \* \* \*